US011417074B2

(12) United States Patent
Besehanic

(10) Patent No.: US 11,417,074 B2
(45) Date of Patent: *Aug. 16, 2022

(54) METHODS AND APPARATUS FOR IDENTIFYING OBJECTS DEPICTED IN A VIDEO USING EXTRACTED VIDEO FRAMES IN COMBINATION WITH A REVERSE IMAGE SEARCH ENGINE

(71) Applicant: The Nielsen Company (US), LLC, New York, NY (US)

(72) Inventor: Jan Besehanic, Tampa, FL (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/204,641

(22) Filed: Mar. 17, 2021

(65) Prior Publication Data
US 2021/0201094 A1 Jul. 1, 2021

Related U.S. Application Data

(63) Continuation of application No. 16/418,649, filed on May 21, 2019, now Pat. No. 10,984,296, which is a
(Continued)

(51) Int. Cl.
G06F 16/00 (2019.01)
G06V 10/10 (2022.01)
(Continued)

(52) U.S. Cl.
CPC .......... G06V 10/10 (2022.01); G06F 11/3476 (2013.01); G06F 16/40 (2019.01);
(Continued)

(58) Field of Classification Search
CPC .......... G06F 16/40; G06F 16/50; G06F 16/58; G06F 16/78; G06F 16/583; G06F 16/7837
(Continued)

(56) References Cited

U.S. PATENT DOCUMENTS 5,579,471 A 11/1996 Barber et al.
6,311,390 B1 11/2001 Abe
(Continued)

OTHER PUBLICATIONS

Zheng et al., "Getting the 'best guess' of an image like google reverse image search," Mar. 20, 2014, retrieved from [https://stackoverflow.com/questions/19239811/getting-the-best-guess-info-of-an-image-like-google-reverse-image-search], 2 pages.
(Continued)

Primary Examiner — Ashish Thomas
Assistant Examiner — Rezwanul Mahmood
(74) Attorney, Agent, or Firm — Hanley, Flight & Zimmerman

(57) ABSTRACT

Example systems disclosed herein are to process image frames with a reverse image search engine to generate corresponding search results pages, capture screenshots corresponding respectively to the search results pages, generate base query records corresponding to respective ones of the screenshots that have respective textual information that matches a base search term, the respective ones of the base query records including the base search term and at least portions of the respective textual information from the corresponding screenshots, determine an object search term based on a frequency analysis of the textual information included in the base query records, generate object query records corresponding respectively to ones of the base query records that have respective textual information matching the object search term, and identify a first object depicted in
(Continued)

the video based on at least one criteria applied to the object query records.

20 Claims, 17 Drawing Sheets

Related U.S. Application Data continuation of application No. 16/051,224, filed on Jul. 31, 2018, now Pat. No. 10,331,984, which is a continuation of application No. 14/750,552, filed on Jun. 25, 2015, now Pat. No. 10,062,015.

(51) Int. Cl.

| | | |
|---|---|---|
| *G06F 11/34* | (2006.01) | |
| *G06F 16/50* | (2019.01) | |
| *G06F 16/58* | (2019.01) | |
| *G06F 16/78* | (2019.01) | |
| *G06F 16/583* | (2019.01) | |
| *G06F 16/783* | (2019.01) | |
| *G06F 16/40* | (2019.01) | |
| *G06V 20/00* | (2022.01) | |
| *G06V 20/62* | (2022.01) | |
| *G06V 30/224* | (2022.01) | |

(52) U.S. Cl.
CPC .............. *G06F 16/50* (2019.01); *G06F 16/58* (2019.01); *G06F 16/583* (2019.01); *G06F 16/78* (2019.01); *G06F 16/7837* (2019.01); *G06V 20/00* (2022.01); *G06V 20/62* (2022.01); *G06V 30/224* (2022.01); *G06V 2201/09* (2022.01)

(58) Field of Classification Search
USPC ........................................................ 707/706
See application file for complete search history.

(56) References Cited

U.S. PATENT DOCUMENTS

| | | | |
|---|---|---|---|
| 6,502,105 B1 | 12/2002 | Yan et al. | |
| 7,212,671 B2 | 5/2007 | Kim et al. | |
| 7,822,850 B1 | 10/2010 | Brikman et al. | |
| 7,870,130 B2 | 1/2011 | Banerjee et al. | |
| 8,019,162 B2* | 9/2011 | Zhang .................... | H04H 60/31 382/199 |
| 8,090,822 B2 | 1/2012 | Lee | |
| 8,364,660 B2* | 1/2013 | Delgo ................... | G06F 16/784 707/706 |
| 8,364,698 B2* | 1/2013 | Delgo ................... | G11B 27/34 707/769 |
| 8,396,302 B2 | 3/2013 | Levy et al. | |
| 8,433,611 B2 | 4/2013 | Lax et al. | |
| 8,806,006 B2 | 8/2014 | Lee | |
| 9,031,974 B2* | 5/2015 | Delgo ................... | G11B 27/329 707/769 |
| 10,062,015 B2* | 8/2018 | Besehanic .............. | G06V 10/10 |
| 10,242,035 B1* | 3/2019 | Asman .................. | G06K 9/6215 |
| 10,331,984 B2* | 6/2019 | Besehanic .............. | G06F 16/50 |
| 10,346,461 B1* | 7/2019 | Asman .................. | G06V 20/10 |
| 10,984,296 B2* | 4/2021 | Besehanic .............. | G06F 16/583 |
| 2009/0123025 A1 | 5/2009 | Deng et al. | |
| 2010/0067745 A1* | 3/2010 | Kovtun .................. | G06V 20/40 382/106 |
| 2010/0070483 A1* | 3/2010 | Delgo ................... | G06F 16/739 707/706 |
| 2010/0070523 A1* | 3/2010 | Delgo ................... | G06F 16/743 707/769 |
| 2011/0035373 A1 | 2/2011 | Berg | |
| 2011/0047163 A1 | 2/2011 | Chechik et al. | |
| 2012/0030234 A1 | 2/2012 | Ramachandrula et al. | |
| 2012/0042279 A1 | 2/2012 | Naderi | |
| 2012/0191575 A1* | 7/2012 | Vilke ................... | G06Q 30/0641 705/27.1 |
| 2013/0014016 A1* | 1/2013 | Delgo ................... | G06F 16/784 715/723 |
| 2013/0086105 A1* | 4/2013 | Hammontree .......... | G06F 3/167 707/769 |
| 2013/0260727 A1 | 10/2013 | Knudson et al. | |
| 2014/0007164 A1 | 1/2014 | Gossweiler, III et al. | |
| 2014/0155022 A1 | 6/2014 | Kandregula | |
| 2014/0164406 A1 | 6/2014 | Petrou | |
| 2014/0201126 A1* | 7/2014 | Zadeh .................... | A61B 5/165 706/52 |
| 2014/0298041 A1 | 10/2014 | Consalus et al. | |
| 2014/0298363 A1 | 10/2014 | Begeja et al. | |
| 2014/0330963 A1 | 11/2014 | Lee | |
| 2015/0026785 A1* | 1/2015 | Soon-Shiong .......... | G06F 21/35 726/7 |
| 2015/0050010 A1* | 2/2015 | Lakhani ............... | G11B 27/036 386/285 |
| 2016/0358632 A1* | 12/2016 | Lakhani ................. | H04N 9/802 |
| 2016/0378790 A1* | 12/2016 | Besehanic .............. | G06V 20/00 707/706 |
| 2017/0177600 A1* | 6/2017 | Zhang ................ | G06F 16/90324 |
| 2017/0220857 A1* | 8/2017 | Szostak ................ | G06K 9/6284 |
| 2017/0308552 A1* | 10/2017 | Soni ...................... | G06F 16/243 |
| 2018/0336442 A1* | 11/2018 | Besehanic .............. | G06F 16/40 |
| 2019/0034964 A1* | 1/2019 | Armbrust ............. | G06V 30/416 |
| 2019/0114131 A1* | 4/2019 | Wygonik ............... | G06F 3/1423 |
| 2019/0272452 A1* | 9/2019 | Besehanic .............. | G06V 20/62 |
| 2020/0314122 A1* | 10/2020 | Jones .................. | H04L 63/1441 |
| 2021/0201094 A1* | 7/2021 | Besehanic .............. | G06V 10/10 |
| 2021/0248624 A1* | 8/2021 | Keren ................ | G06Q 30/0185 |

OTHER PUBLICATIONS

United States Patent and Trademark Office, "Non-Final Office Action," issued in connection with U.S. Appl. No. 14/750,552, dated Nov. 15, 2017, 12 pages.

United States Patent and Trademark Office, "Notice of Allowance" issued in connection with U.S. Appl. No. 14/750,552, dated May 1, 2018, 11 pages.

United States Patent and Trademark Office, "Non-Final Office Action," issued in connection with U.S. Appl. No. 16/051,224, dated Oct. 18, 2018, 27 pages.

United States Patent and Trademark Office, "Notice of Allowance and Fee(s) Due," issued in connection with U.S. Appl. No. 16/051,224, dated Feb. 13, 2019, 16 pages.

United States Patent and Trademark Office, "Non-Final Office Action," issued in connection with U.S. Appl. No. 16/418,649, dated Aug. 20, 2020, 14 pages.

United States Patent and Trademark Office, "Notice of Allowance and Fee(s) Due," issued in connection with U.S. Appl. No. 16/418,649, dated Dec. 21, 2020, 5 pages.

\* cited by examiner

When searching for "Best guess": — 1008 result1.txt:Best guess for this image: coke personalized bottle — 1012
result2.txt:Best guess for this image: coke personalized bottle — 1014
result3.txt:Best guess for this image: coke personalized bottle
result4.txt:Best guess for this image: coke personalized bottle
result5.txt:Best guess for this image: coke personalized bottle
result6.txt:Best guess for this image: coke personalized bottle
result7.txt:Best guess for this image: coke personalized bottle
result8.txt:Best guess for this image: coke personalized bottle
result9.txt:Best guess for this image: coke personalized bottle
result10.txt:Best guess for this image: coke personalized bottle
result11.txt:Best guess for this image: coke personalized bottle
result12.txt:Best guess for this image: coke personalized bottle
result13.txt:Best guess for this image: coke personalized bottle
result14.txt:Best guess for this image: coke personalized bottle
result15.txt:Best guess for this image: coke personalized bottle
· · ·
result896.txt:Best guess for this image: share a coke with names list
result897.txt:Best guess for this image: share a coke with names list
result898.txt:Best guess for this image: share a coke with names list
result899.txt:Best guess for this image: share a coke with names list
result900.txt:Best guess for this image: share a coke with names list Total number of base query records: 900

FIG. 11

When searching for "coke personalized bottle": — 1202 result1.txt:Best guess for this image: coke personalized bottle — 1206
result2.txt:Best guess for this image: coke personalized bottle — 1208
result3.txt:Best guess for this image: coke personalized bottle
result4.txt:Best guess for this image: coke personalized bottle
result5.txt:Best guess for this image: coke personalized bottle
result6.txt:Best guess for this image: coke personalized bottle
result7.txt:Best guess for this image: coke personalized bottle
result8.txt:Best guess for this image: coke personalized bottle
result9.txt:Best guess for this image: coke personalized bottle
result10.txt:Best guess for this image: coke personalized bottle
result11.txt:Best guess for this image: coke personalized bottle
result12.txt:Best guess for this image: coke personalized bottle
result13.txt:Best guess for this image: coke personalized bottle
result14.txt:Best guess for this image: coke personalized bottle
result15.txt:Best guess for this image: coke personalized bottle Total number of object query records: 15

FIG. 13

```
1502 — ffmpeg -i coca.mp4 coke-%3d.jpeg
1504 — cp coke*.jpeg /Volumes/webserver/gis/
1506 — for i in {1..3000}
        do
1508 — webkit2png http://images.google.com/searchbyimage?image_url=http://nielsen.guru.gis/coke-$i.jpeg
1510 — tesseract "imagesgooglecomsearchbyimageimage_urlhttpnielsengurugiscoke"$i"jpeg-full.png" "result"$i
1512 — done
1514 — grep -ir "Best guess" result*.txt > bestguess.txt
1516 — grep -ir "coke personalized bottle" result*.txt > bestguesscokepersonalizedbottle.txt
1518 ⎰ wc -1 bestguesscokepersonalizedbottle.txt
       ⎱ wc -1 bestguess.txt
       #wc = number of lines in text
```

FIG. 15

METHODS AND APPARATUS FOR IDENTIFYING OBJECTS DEPICTED IN A VIDEO USING EXTRACTED VIDEO FRAMES IN COMBINATION WITH A REVERSE IMAGE SEARCH ENGINE

RELATED APPLICATIONS

This patent arises from a continuation of U.S. patent application Ser. No. 16/418,649, filed May 21, 2019, entitled "Methods and Apparatus for Identifying Objects Depicted in a Video Using Extracted Video Frames in Combination with a Reverse Image Search Engine," which is a continuation of U.S. patent application Ser. No. 16/051,224, filed Jul. 31, 2018, entitled "Methods and Apparatus for Identifying Objects Depicted in a Video Using Extracted Video Frames in Combination with a Reverse Image Search Engine," which is a continuation of U.S. patent application Ser. No. 14/750,552, filed Jun. 25, 2015, entitled "Methods and Apparatus for Identifying Objects Depicted in a Video Using Extracted Video Frames in Combination with a Reverse Image Search Engine," the entireties of which are hereby incorporated herein by reference. Priority to U.S. patent application Ser. No. 16/418,649, U.S. patent application Ser. No. 16/051,224, and U.S. patent application Ser. No. 14/750,552 is claimed.

FIELD OF THE DISCLOSURE

This disclosure relates generally to object identification techniques, and, more particularly, to methods and apparatus for identifying one or more objects depicted in a video using extracted video frames in combination with a reverse image search engine.

BACKGROUND

Image recognition is the process of identifying and/or detecting an object or a feature in a digital image or video. Image recognition technologies may be used to identify objects, people, places, logos, brands, and/or anything else that may have value to and/or be of interest to individuals, consumers and/or corporate entities, etc.

BRIEF DESCRIPTION OF THE DRAWINGS

FIG. 11 illustrates an example base query record data structure including example base query records generated by the example base query record generator of FIGS. 2 and/or 10.

FIG. 13 illustrates an example object query record data structure including example object query records generated by the example object query record generator of FIGS. 2 and/or 12.

FIG. 15 illustrates an example script including example machine-readable instructions that may be executed to implement the example video object identification system of FIGS. 1 and/or 2.

The figures are not to scale. Wherever possible, the same reference numbers will be used throughout the drawing(s) and accompanying written description to refer to the same or like parts.

DETAILED DESCRIPTION

Figure 1:
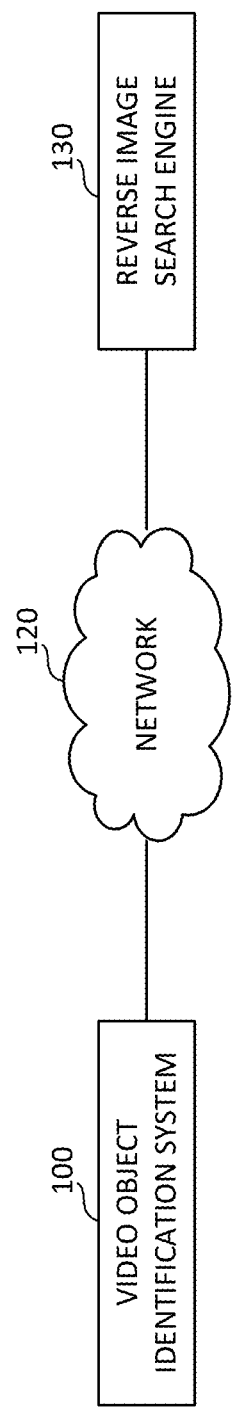
FIG. 1 is an illustration of an example computing environment in which an example video object identification system and an example reverse image search engine may be used to identify one or more objects depicted in a video in accordance with the teachings of this disclosure.

Consumer measurement companies spend substantial resources developing and implementing elaborate image recognition techniques and/or solutions to identify logos, brands and/or commercials that are depicted in various media formats. The image recognition techniques and/or solutions disclosed herein provide a cost-effective alternative or compliment to existing image recognition techniques and/or solutions.

Example methods, systems, and apparatus disclosed herein identify an object depicted in a video utilizing images extracted from the video in combination with a reverse image search engine. In some disclosed examples, the images extracted from the video are provided to the reverse image search engine. In some disclosed examples, the images are extracted from the video by executing a video frame extraction application. In some disclosed examples, the reverse image search engine is hosted by a webserver.

In some disclosed examples, a search results page returned by the reverse image search engine is accessed, and textual information presented in the search results page is identified. In some disclosed examples, identifying the textual information includes capturing a screen shot of the search results page. In some disclosed examples, capturing the screen shot includes executing a screen capture application. In some disclosed examples, identifying the textual information includes executing an optical character recognition application to determine the textual information from the captured screen shot. By obtaining the textual information from the captured screen shot, as opposed to obtaining the textual information directly from the search results page, at least some example methods, systems and apparatus disclosed herein avoid the need to parse dynamic data (e.g., data that can change at any time, such as, for example, HyperText Markup Language (HTML), Extensible Markup Language (XML), JavaScript Object Notation (JSON) data, etc.) from the identified textual information.

In some disclosed examples, an object depicted in the video is identified based on a statistical criterion applied to object query records generated in response to a query of base query records, where the base query records are generated in response to a query of the identified textual information. In some disclosed examples, the query that results in the generation of the base query records includes a base search term, while the query that results in the generation of the object query records includes an object search term. In some disclosed examples, the statistical criterion includes a threshold that is measured against the object query records and/or the base query records (e.g., a specified total number of object query records associated with a particular object search term, a specified number of object query records associated with a particular object search term within a specified time period, a specified consecutive number of object query records associated with a particular object search term, a specified percentage of the number of object query records associated with a particular object search term relative to the number of base query records from which the object query records were derived, etc.). In some disclosed examples, the identified object depicted in the video includes at least one of a logo, a brand, or a commercial.

FIG. 1 illustrates an example computing environment in which an example video object identification system 100 and an example reverse image search engine 130 constructed in accordance with the teachings of this disclosure may be used to identify one or more objects depicted in a video. In the illustrated example, the video object identification system 100 communicates with the reverse image search engine 130 via an example network 120 which may be implemented by any number and/or type(s) of communication networks. In some examples, the network 120 is the Internet. In some examples, the network 120 may be implemented by a Wide Area Network (WAN) or a Local Area Network (LAN), or a combination thereof.

In the illustrated example of FIG. 1, the example video object identification system 100 and/or the example reverse image search engine 130 can be implemented by, for example, one or more of a server, a personal computer, a tablet, a smartphone, and/or any other type of computing device. In some examples, the reverse image search engine 130 is hosted by a remote webserver that is accessible to the example video object identification system 100 via the example network 120. While the illustrated example of FIG. 1 shows the example reverse image search engine 130 being located remotely from the example video object identification system 100, the reverse image search engine 130 may alternatively reside locally within the video object identification system 100. In such an alternate example, the video object identification system 100 may be able to directly communicate with the example reverse image search engine 130 without using the example network 120.

Figure 2:
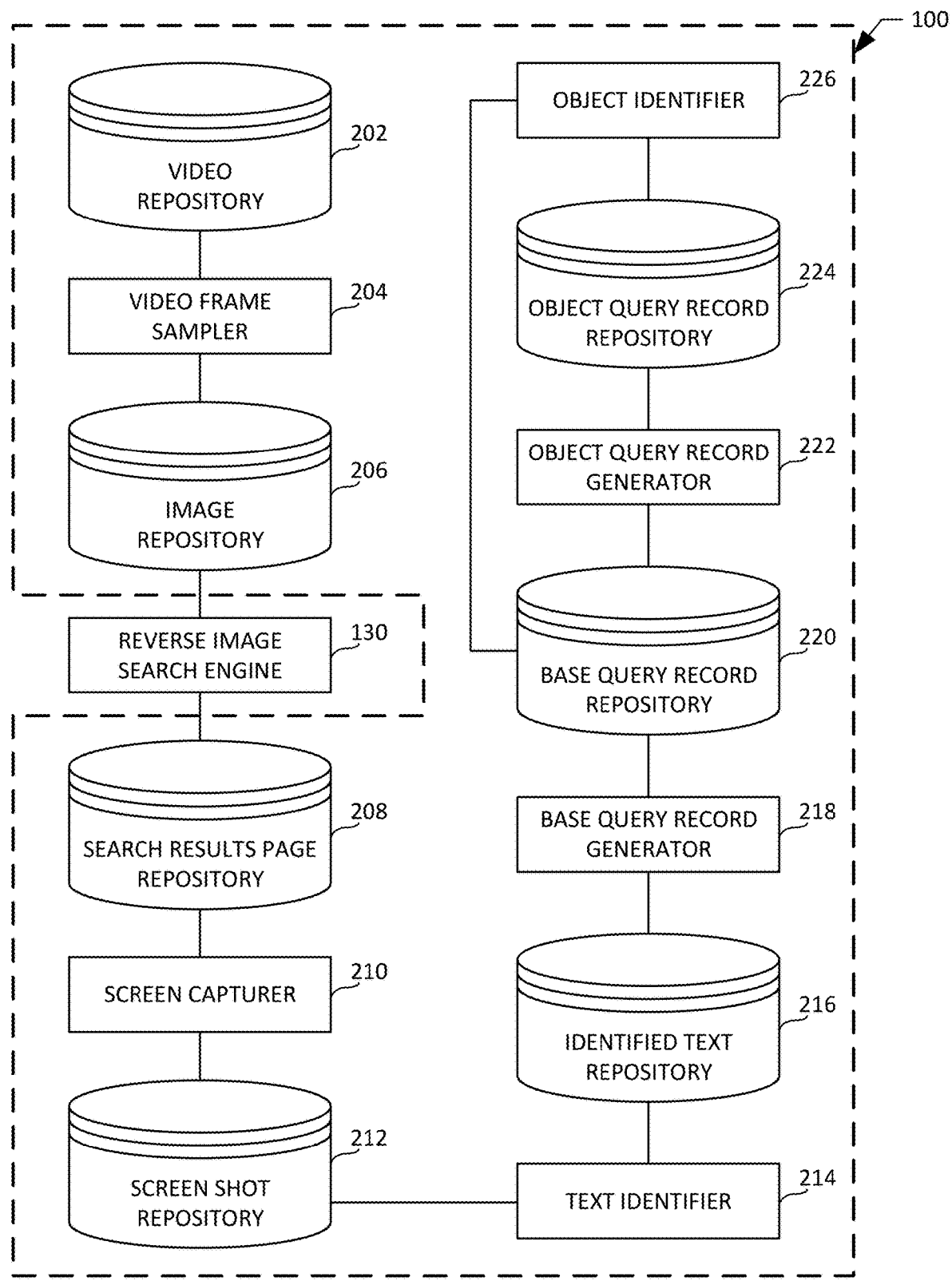
FIG. 2 is a block diagram of the example video object identification system and the example reverse image search engine of FIG. 1.

FIG. 2 is a block diagram of the example video object identification system 100 and the example reverse image search engine 130 of FIG. 1 constructed in accordance with the teachings of this disclosure to identify one or more objects in a video. The example video object identification system 100 and/or the example reverse image search engine 130, including any components and/or subsystems thereof, may be implemented using either a single computing system or multiple computing systems, and may be implemented using either a centralized computer architecture or a distributed computer architecture, or a combination thereof.

In the illustrated example of FIG. 2, the video object identification system 100 includes an example video repository 202, an example video frame sampler 204, an example image repository 206, an example search results page repository 208, an example screen capturer 210, an example screen shot repository 212, an example text identifier 214, an example identified text repository 216, an example base query record generator 218, an example base query record repository 220, an example object query record generator 222, an example object query record repository 224, and an example object identifier 226. However, other example implementations of the video object identification system 100 may include fewer or additional structures to carry out identification of objects in video in accordance with the teachings of this disclosure.

In the illustrated example of FIG. 2, the example video repository 202 stores one or more videos. The example video repository 202 of FIG. 2 is implemented by one or more hard disk drives. However, the example video repository 202 could additionally or alternatively be implemented by any type(s) and/or any number(s) of a storage drive, a storage disk, a flash memory, a read-only memory (ROM), a compact disk (CD), a digital versatile disk (DVD), a Blu-ray disc, a cache, a random-access memory (RAM) and/or any other storage medium in which information is stored for any duration (e.g., for extended time periods, permanently, brief instances, for temporarily buffering, and/or for caching of the information). Videos stored in the example video repository 202 may be stored in any file and/or data structure format, organization scheme, and/or arrangement. For example, a video may be stored in the example video repository 202 as an Advanced Streaming Format (.ASF), Advanced Stream Redirector (.ASX), Audio Video Interleaved (.AVI), Blu-ray Disc Movie (.BDMV), DivXNetworks (.DIVX), Flash MP4 Video (.F4V), Flash Live Video (.FLV), Google Video (.GVI), Matroska Multimedia Container (.MKV), Moving Picture Experts Group (.MPEG, .MPG, .MP4 or .M4V), MPEG Transport Stream (.MTS or .M2TS), NullSoft Video (.NSV), QuickTime Content (.QT or .MOV), Real Media (.RM), Samsung Video (.SVI), Windows Media Video (.WMV), 3rd Generation Partnership Project (.3GP and/or .3GPP), and/or 3rd Generation Partnership Project 2 (.3G2 or .3GP2) file. As described in detail herein, videos stored in the example video repository 202 are accessible to the example frame sampler 204 of FIG. 2, and/or, more generally, to the example video object identification system 100 of FIG. 1.

In the illustrated example of FIG. 2, the example frame sampler 204 extracts and/or samples frames and/or images from a video. In some examples, the frame sampler 204 receives and/or otherwise retrieves the video from the example video repository 202 described above. The example frame sampler 204 of FIG. 2 is further illustrated in FIG. 3. In the illustrated example of FIG. 3, the frame sampler 204 receives and/or otherwise retrieves an example video 302 from the video repository 202. The frame sampler 204 implements any appropriate sampling process to extract frames and/or images from the example video 302. In the illustrated example of FIG. 3, the extracted frames constitute example images 304, including example image 306, example image 308 and example image 310.

The number of example images 304 generated by the example frame sampler 204 may be based on variables including, for example, the duration of the example video 302, the frequency at which the frame sampler 204 samples and/or extracts the example video 302, and/or a threshold number of frames that the frame sampler 204 is instructed to sample and/or extract from the example video 302. For example, if the video 302 has a duration of thirty seconds and the example frame sampler 204 extracts frames at a frequency and/or sampling rate of 30 frames per second, the example frame sampler 204 will generate nine hundred (900) example images 304 in the course of processing the example video 302. In another example, the frame sampler 204 may be instructed to generate three hundred (300) example images 304 from the example video 302 regardless of the duration of the video. In such an example, the frame sampler 204 determines the duration of the example video 302, and then establishes a sampling frequency and/or sampling rate that facilitates the generation of the specified number of example images 304.

Figure 3:
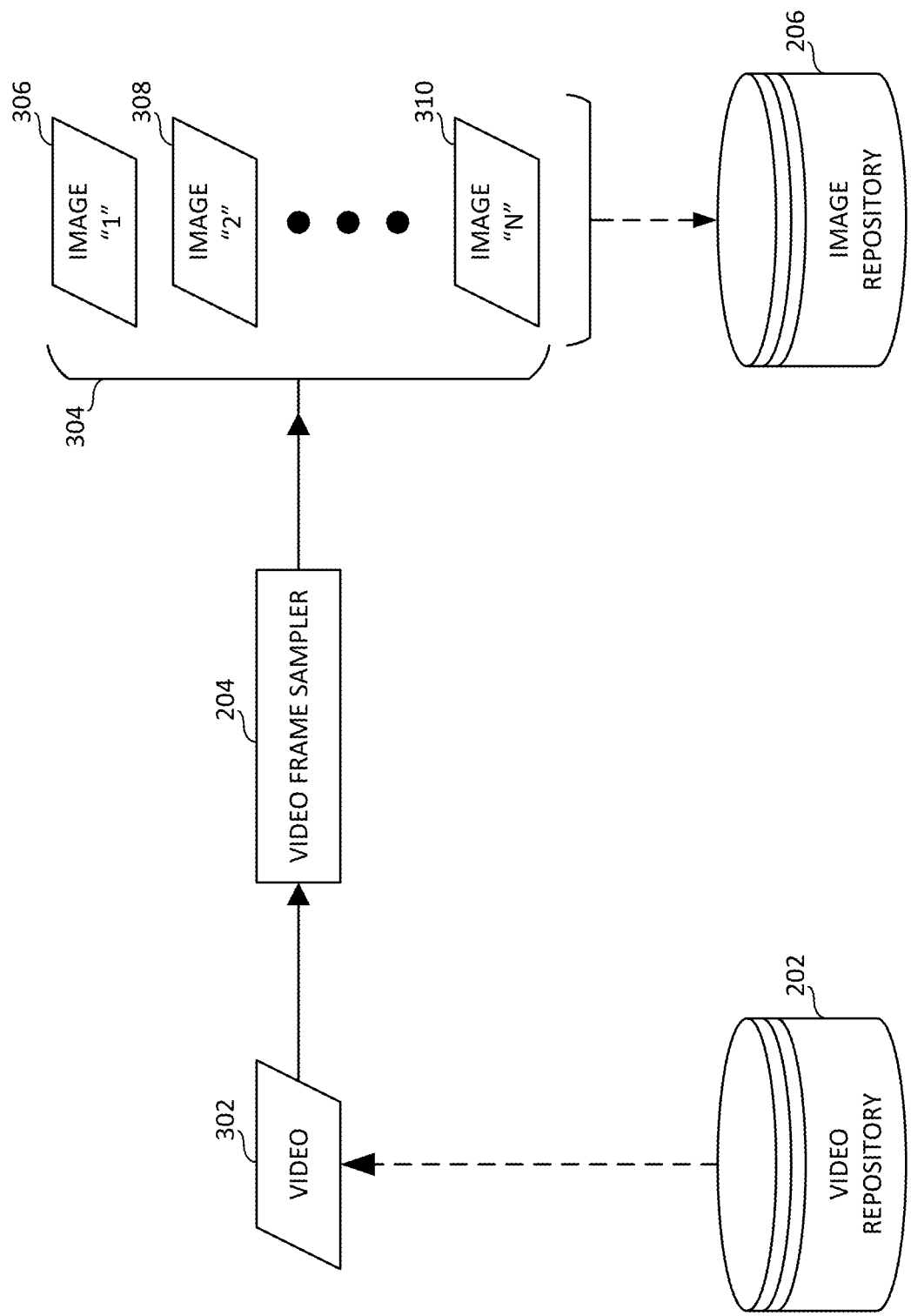
FIG. 3 further illustrates operation of the example video frame sampler of FIG. 2.

In the illustrated examples of FIGS. 2 and 3, the example frame sampler 204 may take the form of an executable video frame extraction application. For example, the frame sampler 204 may be implemented by the downloadable application known as "FFmpeg" (available for download at https://www.ffmpeg.org/).

Figure 4:
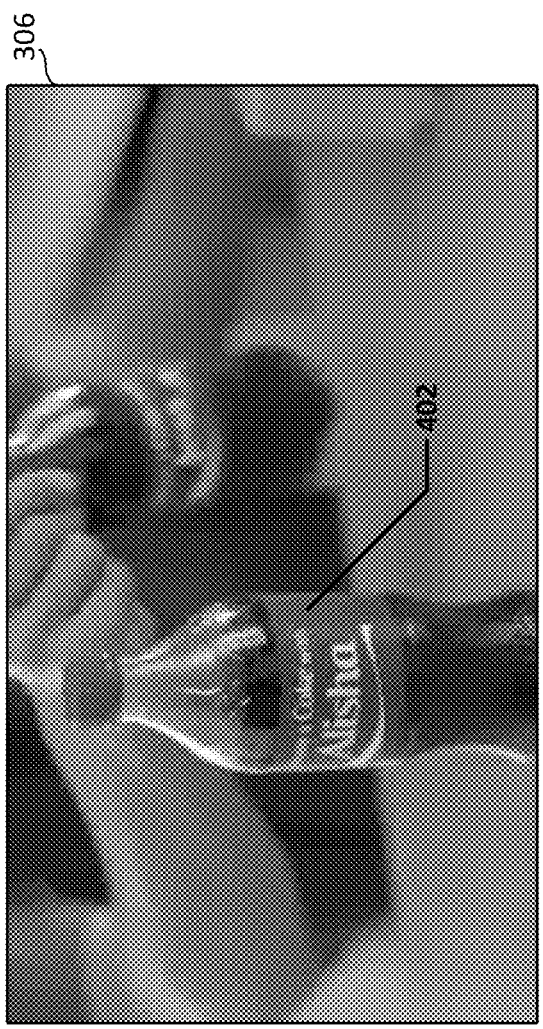
FIG. 4 illustrates an example image generated by the example video frame sampler of FIGS. 2 and/or 3.

FIG. 4 is an illustration of the example image 306 generated by the example video frame sampler 204 of FIGS. 2 and/or 3. In the illustrated example of FIG. 4, the example image 306 includes an example object 402. In the illustrated example, the object 402 is a bottle of Coke® having a label associated with The Coca-Cola Company, the label including the word "Alisha" among other textual information.

Returning to the illustrated example of FIG. 2, the example image repository 206 stores the example images 304 generated by the example video frame sampler 204. The example image repository 206 of FIG. 2 is implemented by one or more hard disk drives. However, the example image repository 206 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example images 304 stored in the example image repository 206 may be stored in any file and/or data structure format, organization scheme, and/or arrangement. For example, an image (e.g., the example image 306 of FIG. 3) may be stored as a Bitmap (.BMP), Better Portable Graphics (.BPG), Computer Graphics Metafile (.CGM), Graphics Interchange Format (.GIF), Joint Photographic Experts Group (.JPEG or .JPG), Portable Network Graphics (.PNG), Scalable Vector Graphics (.SVG), and/or Tagged Image File Format (.TIF and/or .TIFF) file.

The example images 304 stored in the example image repository 206 are accessible to the example reverse image search engine 130 of FIGS. 1 and/or 2, and/or, more generally, to the example video object identification system 100 of FIGS. 1 and/or 2. In some examples, the example image repository 206 includes a webserver to which the example images 304 are uploaded. In some such examples, the webserver is associated with one or more Uniform Resource Locators (URLs) that may be used by the example reverse image search engine 130 of FIGS. 1 and/or 2 to access the example images 304 residing on the webserver.

In the illustrated example of FIGS. 1 and/or 2, the example reverse image search engine 130 searches for data that is relevant to and/or associated with an image. In some examples, the reverse image search engine 130 receives and/or otherwise retrieves the image from the example image repository 206 described above. For example, the image 306 described above in connection with FIGS. 3 and 4 may be uploaded to the example reverse image search engine 130 by the example video object identification system 100. Additionally or alternatively, the example video object identification system 100 may provide the example reverse image search engine 130 with a URL corresponding to a webserver on which the example image 306 resides. In such an example, the reverse image search engine 130 requests and/or accesses the example image 306 from the webserver based on the URL provided by the example video object identification system 100.

Figure 5:
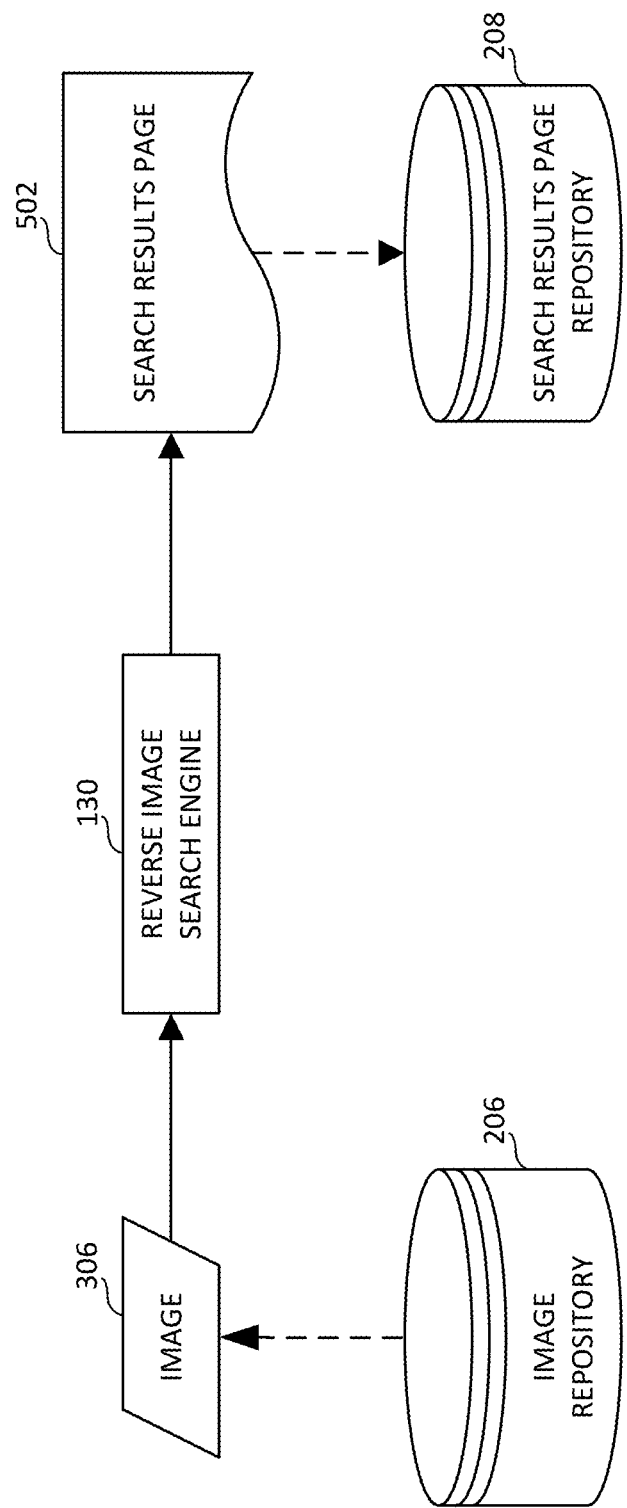
FIG. 5 further illustrates operation of the example reverse image search engine of FIGS. 1 and/or 2.

The example reverse image search engine 130 of FIGS. 1 and/or 2 is further illustrated in FIG. 5. In the illustrated example of FIG. 5, the reverse image search engine 130 receives and/or otherwise retrieves the example image 306 as described above. In the illustrated example, the reverse image search engine 130 formulates a search query based on the example image 306, as opposed to a search query based on textual search terms (e.g., keywords and/or other terms) provided and/or selected by a user. In some examples, the example reverse image search engine 130 formulates the search query by constructing a mathematical model of the example image 306 using computer vision algorithms that may include, for example, Scale-Invariant Feature Transform (SIFT), Maximally Stable Extremal Regions (MSER) and/or Bag-of-Words (BoW) algorithms.

In the illustrated example of FIGS. 1, 2 and/or 5, the example reverse image search engine 130 searches one or more data sources (e.g., an index and/or a database) for data (e.g., images and/or metadata including textual and/or graphical information) that the reverse image search engine 130 determines to match, be relevant to, and/or otherwise be associated with the example image 306 based on the formulated search query. For example, if the example image 306 received and/or otherwise retrieved by the example reverse image search engine 130 includes the example object 402 described above in connection with FIG. 4, the reverse image search engine 130 may determine that textual and/or graphical information relating to The Coca-Cola Company, Coke® products, and/or an advertising campaign (e.g., a commercial) affiliated with The Coca-Cola Company and/or Coke® products is relevant to and/or associated with the example image 306. In some examples, the data identified by the example reverse image search engine 130 may identify the source of the example image 306 and/or one or more webpage(s) where the example image 306 appears.

In the illustrated example of FIG. 5, the reverse image search engine 130 generates an example search results page 502 that includes some and/or all of the data that the example reverse image search engine 130 determines to be relevant to and/or associated with the example image 306. The data included in the example search results page 502 may be organized and/or otherwise structured according to any format determined by the example reverse image search engine 130. For example, the reverse image search engine 130 may organize the data included in the example search results page 502 based on the relevance of the data. In such an example, the data that the example reverse image search engine 130 determines to be most relevant to the example image 306 may be organized such that the most relevant data is positioned at the top of the example search results page 502 when the search results page 502 is rendered for display (e.g., when a browser application renders the search results page 502 for display on a display device, such as a computer monitor).

In the illustrated examples of FIGS. 1, 2 and 5, the example reverse image search engine 130 may be hosted by a third party webserver. For example, the reverse image search engine 130 may be a reverse image search engine hosted by Google, Inc. (e.g., Google® Images), Microsoft Corp. (e.g., Bing® Image Match), Idee, Inc. (e.g., TinEye®), etc.

Returning to the illustrated example of FIG. 2, the example search results page repository 208 stores search results pages (e.g., the example search results page 502 of FIG. 5) generated by the example reverse image search engine 130. The example search results page repository 208 of FIG. 2 is implemented by one or more hard disk drives. However, the example search results page repository 208 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example search results page 502 stored in the example search results page repository 208 may be stored in any file and/or data structure format, organization scheme, and/or arrangement. For example, the search results page 502 may be stored as a HyperText Markup (.HTM) and/or HyperText Markup Language (.HTML) file. The example search results page 502 stored in the example search results page repository 208 is accessible to the example screen capturer 210 of FIG. 2, and/or, more generally, to the example video object identification system 100 of FIG. 1.

In the illustrated example of FIG. 2, the example screen capturer 210 captures a screen shot of the search results page generated by the example reverse image search engine 130. In some examples, the screen capturer 210 receives and/or otherwise retrieves the search results page from the example search results page repository 208 described above. For example, the search results page 502 described above in connection with FIG. 5 may be accessed by the example screen capturer 210 from the example search results page repository 208. Alternatively, the example screen capturer 210 may access the example search results page 502 directly from the example reverse image search engine 130. In such an example, the search results page repository 208 described above may be omitted from the video object identification system 100.

Figure 6:
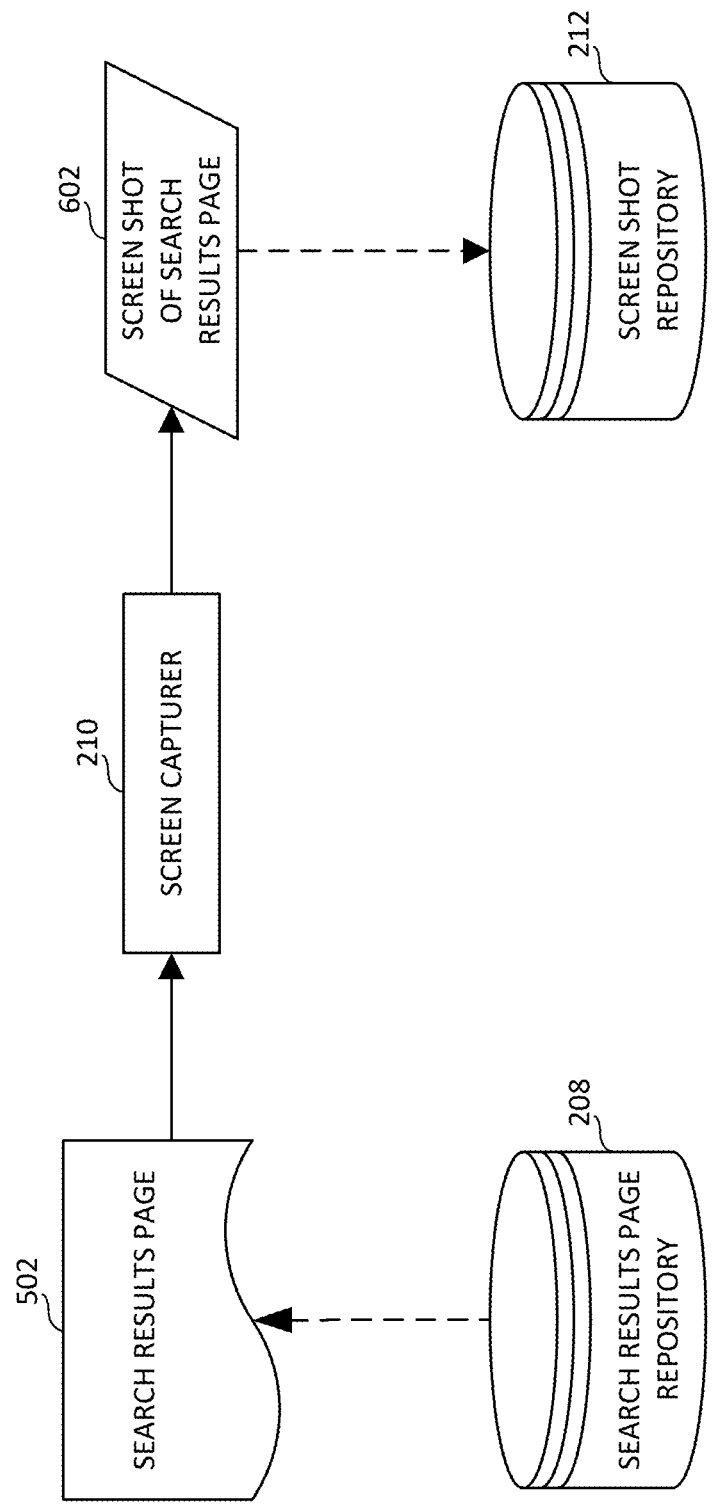
FIG. 6 further illustrates operation of the example screen capturer of FIG. 2.

The example screen capturer 210 of FIG. 2 is further illustrated in FIG. 6. In the illustrated example of FIG. 6, the screen capturer 210 receives and/or otherwise retrieves the example search results page 502 as described above. The example screen capturer 210 generates an example screen shot 602 corresponding to and/or associated with the example search results page 502. In some examples, prior to the screen capturer 210 generating the example screen shot 602, the example search results page 502 is rendered by a browser application for display on a display device (e.g., a computer monitor). In some examples, the rendering of the example search results page is performed by the example screen capturer 210, and/or, more generally, by the example video object identification system 100.

In the illustrated examples of FIGS. 2 and 6, the example screen capturer 210 may be implemented by an executable screen capture application. For example, the screen capturer 210 may be implemented by the downloadable application known as "webkit2png" (available for download at http://www.paulhammond.org/webkit2png/).

Figure 7:
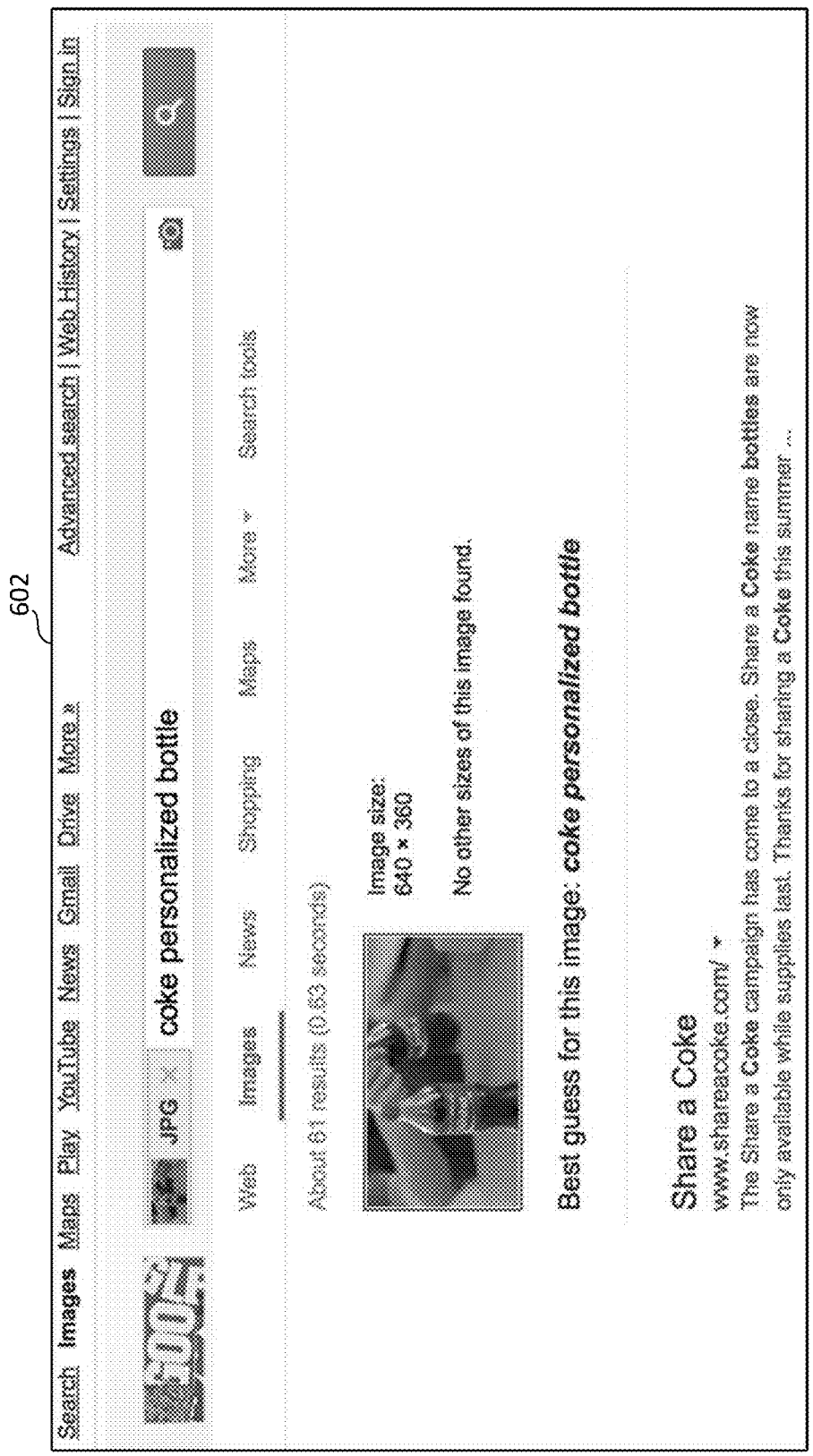
FIG. 7 illustrates an example screen shot generated by the example screen capturer of FIGS. 2 and/or 6.

FIG. 7 is an illustration of the example screen shot 602 generated by the example screen capturer 210 of FIGS. 2 and 6. In the illustrated example of FIG. 7, the example screen shot 602 corresponds to the example search results page 502 generated by the example reverse image search engine 130 based on the example image 306 described above. In the illustrated example, the screen shot 602 depicts the example search results page 502 as rendered for display by a browser application. As described in detail herein, the example screen shot 602 is an image from which textual information (e.g., the words "coke personalized bottle" depicted within the example screen shot 602 of FIG. 7) may be extracted and/or otherwise identified.

Returning to the illustrated example of FIG. 2, the example screen shot repository 212 stores screen shots (e.g., the example screen shot 602 of FIGS. 6 and 7) generated by the example screen capturer 210. The example screen shot repository 212 of FIG. 2 is implemented by one or more hard disk drives. However, the example screen shot repository 212 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example screen shot 602 stored in the example screen shot repository 212 may be stored in any file and/or data structure format, organization scheme, and/or arrangement. For example, the screen shot 602 may be stored as a .BMP, .BPG, .CGM, .GIF, .JPEG, .JPG, .PNG, .SVG, .TIF, and/or .TIFF file. The example screen shot 602 stored in the example screen shot repository 212 is accessible to the example text identifier 214 of FIG. 2, and/or, more generally, to the example video object identification system 100 of FIG. 1.

In the illustrated example of FIG. 2, the example text identifier 214 extracts and/or otherwise identifies textual information from a screen shot generated by the example screen capturer 210. In some examples, the text identifier 214 receives and/or otherwise retrieves the screen shot from the example screen shot repository 212 described above. For example, the screen shot 602 described above in connection with FIGS. 6 and 7 may be accessed by the example text identifier 214 from the example screen shot repository 212. The example text identifier 214 generates an example identified text data structure that includes the identified textual information. The example text identifier 214 of FIG. 2 is further illustrated in FIG. 8. In the illustrated example of FIG. 8, the text identifier 214 receives and/or otherwise retrieves the example screen shot 602 as described above. The example text identifier 214 extracts and/or otherwise identifies textual information from the example screen shot 602. In the illustrated example, the text identifier 214 generates an example identified text data structure 802 that includes the identified textual information.

Figure 8:
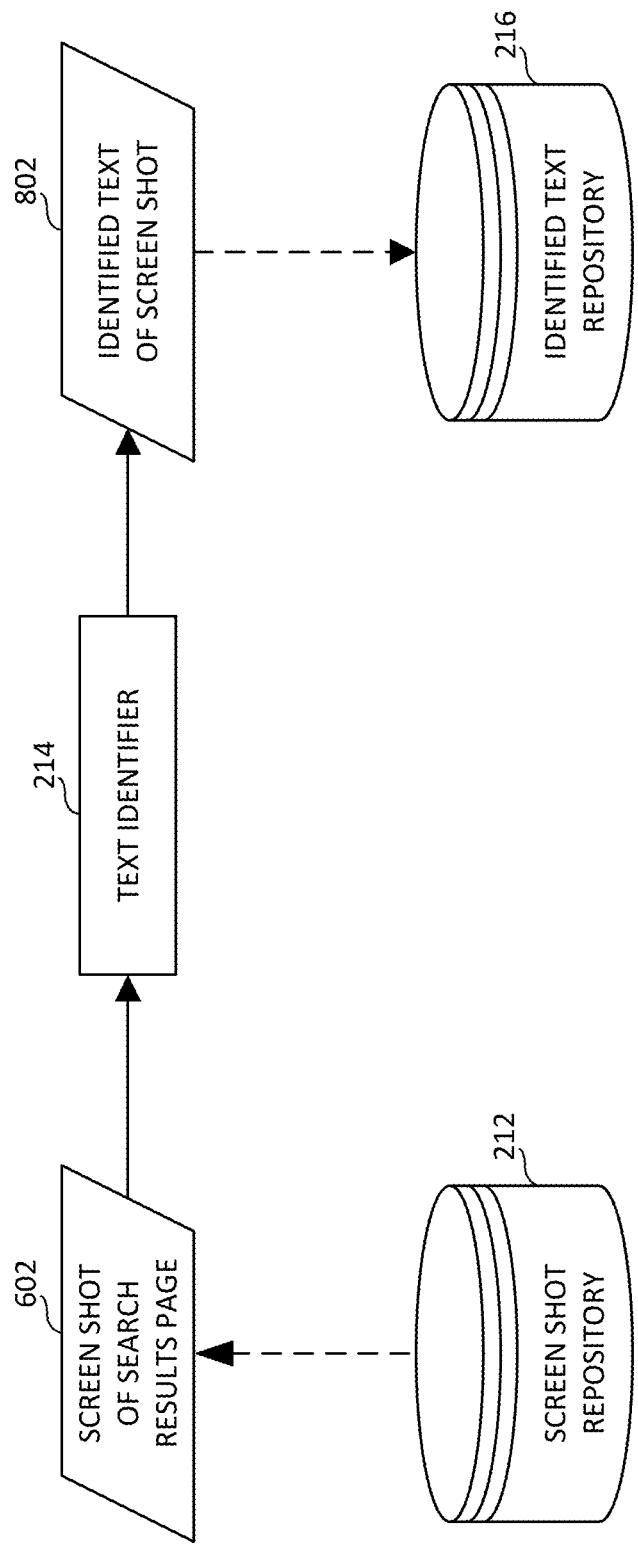
FIG. 8 further illustrates operation of the example text identifier of FIG. 2.

In the illustrated examples of FIGS. 2 and 8, the example text identifier 214 may be implemented by an executable text identification application and/or an executable optical character recognition (OCR) application. For example, the text identifier 214 may be implemented by the downloadable OCR application known as "Tesseract" (available for download at http://code.google.com/p/tesseract-ocr/).

Figure 9:
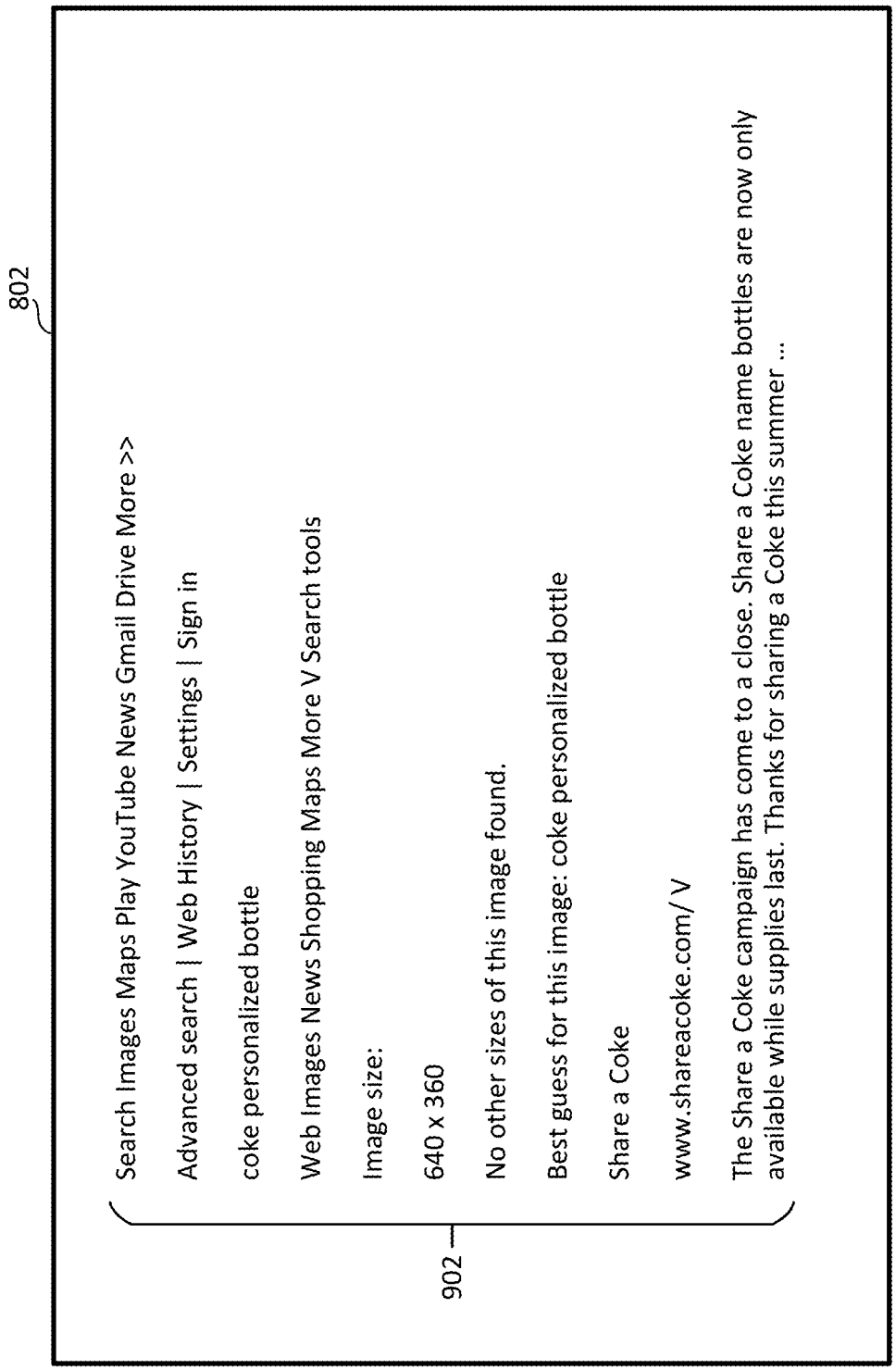
FIG. 9 illustrates an example identified text data structure including example identified textual information generated by the example text identifier of FIGS. 2 and/or 8.

FIG. 9 is an illustration of the example identified text data structure 802 generated by the example text identifier 214 of FIGS. 2 and/or 8. In the illustrated example of FIG. 9, the example identified text data structure 802 corresponds to the example screen shot 602 generated by the example screen capturer 210. For example, the identified text data structure 802 includes example identified textual information 902 that replicates and/or closely approximates the textual information depicted in the example screen shot 602 of FIG. 7. As one example of the aforementioned relationship, the words "Best guess for this image: coke personalized bottle" appear among the textual information depicted in the example screen shot 602, and also appear among the example identified textual information 902 contained in the example identified text data structure 802. In some examples, some or all textual information depicted in the example screen shot 602 will likewise appear among the example identified textual information 902 contained in the example identified text data structure 802. As a result of the aforementioned relationship between the example screen shot 602 and the example data structure 802, the example identified textual information 902 included in the example identified text data structure 802 corresponds to and/or is associated with the example search results page 502 generated by the example reverse image search engine 130 for the example image 306 described above.

As a result of the sequence of screen capture and text identification processes described above, the example video object identification system 100 of FIGS. 1 and/or 2 advantageously implements an object detection process, system and/or apparatus that is parsing-presentation independent. In other words, because the text identification process (e.g., as performed by the example text identifier 214) described above is based on the example screen shot 602, as opposed to being based on the example search results page 502, the example video object identification system 100 need not parse out dynamic data that can change at any time (e.g., HTML, XML, and/or JSON data) from the example identified textual information 902, as otherwise might be necessary were the text identification process instead based on the example search results page 502.

For example, in the case of an example search results page 502 that includes an HTML file, a text identification process applied directly to the HTML file may involve parsing the HTML file to identify which pieces of the file are HTML tags and which pieces of the file are normal text of interest, etc. Once the HTML file has been parsed and its pieces have been identified, such a text identification process might then remove the pieces of the HTML file that do not constitute normal text of interest. In contrast, a screen shot (e.g., the example screen shot 602) of a search results page (e.g., the example search results page 502) will include the normal text of interest, but not any extraneous (e.g., hidden) information such as HTML tags. Thus, the text identification process disclosed herein, which is based on the example screen shot 602, as opposed to being based on the example search results page 502, removes the need for the example video object identification system 100 to perform any parsing processes in relation to the example search results page 502.

Returning to the illustrated example of FIG. 2, the example identified text repository 216 stores identified textual information (e.g., the example identified textual information 902 contained in the example identified text data structure 802 of FIGS. 8 and/or 9) generated by the example text identifier 214. The example identified text repository 216 of FIG. 2 is implemented by one or more hard disk drives. However, the example identified text repository 216 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example identified text data structure 802 stored in the example identified text repository 216 may be stored in any file and/or data structure format, organization scheme, and/or arrangement. For example, the identified text data structure 802 may be stored as a text file (e.g., a .TXT file), a Microsoft® Word document (e.g., a .DOC file, a .DOCX file, etc.), etc. The example identified text data structure 802 stored in the example identified text repository 216 is accessible to the example base query record generator 218 of FIG. 2, and/or, more generally, to the example video object identification system 100 of FIG. 1.

In some examples, the video object identification system 100 of FIGS. 1 and/or 2 repeats the processes described above in connection with the example reverse image search engine 130, the example screen capturer 210 and the example text identifier 214 for each of the example images 304 generated by the example video frame sampler 204 in connection with the example video 302. In some examples, the video object identification system 100 repeats the processes described above in connection with the example reverse image search engine 130, the example screen capturer 210 and the example text identifier 214 for a subset of the set of the example images 304 generated by the example video frame sampler 204 in connection with the example video 302. For example, such a subset of example images 304 may be obtained by uniformly or non-uniformly sampling or otherwise selecting respective ones of the set of example images 304 for inclusion in the subset.

In the illustrated example of FIG. 2, the example base query record generator 218 generates base query records based on a query requesting the identified textual information contained in the identified text data structures generated by the example text identifier 214 that satisfies one or more query criteria. In some examples, the base query record generator 218 receives and/or otherwise retrieves the identified text data structures on which to perform a query from the example identified text repository 216 described above. For example, the identified text data structure 802 described above in connection with FIGS. 8 and 9 may be accessed by the example base query record generator 218 from the example identified text repository 216.

Figure 10:
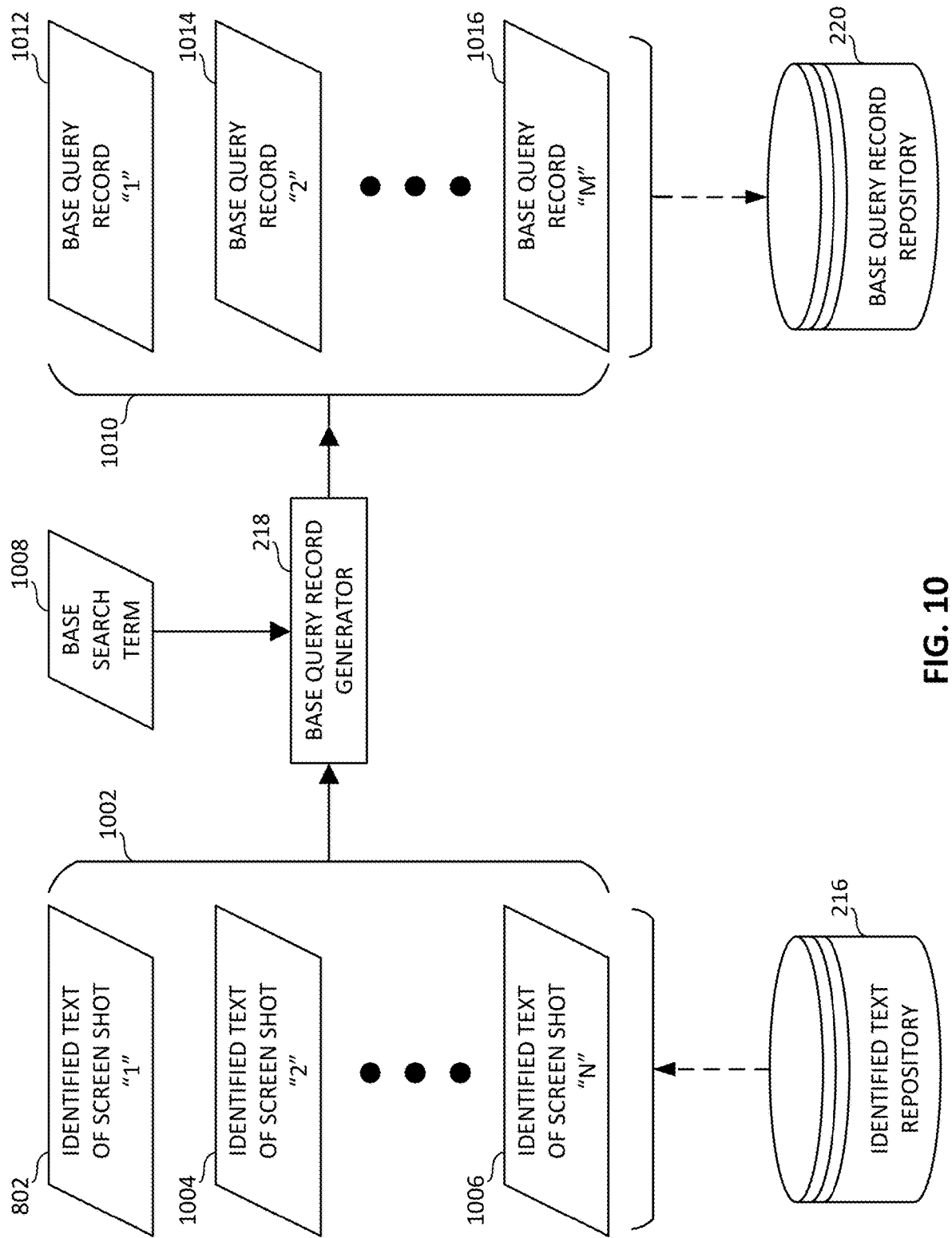
FIG. 10 further illustrates operation of the example base query record generator of FIG. 2.

The example base query record generator 218 of FIG. 2 is further illustrated in FIG. 10. In the illustrated example of FIG. 10, the base query record generator 218 receives and/or otherwise retrieves example identified text data structures 1002, which include the example data structure 802 and example identified text data structures 1004 and 1006. In the illustrated example, the query is executed by the example base query record generator 218 to generate example base query records 1010 based on one or more query criteria including an example base search term 1008. In the illustrated example, the example base query records 1010 include an example base query record 1012, an example base query record 1014 and an example base query record 1016.

In some examples, the base search term 1008 is associated with a word, a phrase and/or a configuration or layout that is expected to be included in the search results page returned by the example reverse image search engine 130 to identify the data relevant to the input image that was searched. For example, the reverse image search engine 130 may include the phrase "Best guess for this image" as part of the example search results page 502 to identify the resulting data found to be most relevant to (e.g., identifying objects in) the input image (e.g., the example image 306). As described above, this same phrase appears in the example screen shot 602 and the example identified textual information 902 of the example identified text data structure 802. In such an example, the phrase "Best guess" may constitute the example base search term 1008 for the query executed by the example base query record generator 218. Of course, other search terms and/or query criteria may additionally or alternatively be included in the query. For example, the phrase "Best Match" may constitute the example base search term 1008. Additionally or alternatively, the example base search term 1008 may involve a position and/or threshold relative to the configuration or layout of the example search results page 502 and/or the example screen shot 602. For example, the example base search term 1008 may specify that the first ten lines of text, or the first one hundred words of text, etc., are to be extracted from the identified text data structures 1002 and included in the corresponding base query records 1010.

In the illustrated example of FIG. 10, the example base query record generator 218 queries the example identified text data structures 1002 to determine if any of the identified text data structures 1002 contain identified textual information matching the example base search term 1008. In instances where the example base query record generator 218 determines that one of the example identified text data structures 1002 (e.g., identified text data structure 802) includes textual information matching the example base search term 1008, the example base query record generator 218 generates a base query record (e.g., the example base query record 1012) corresponding to the identified text data structure (e.g., the example identified text data structure 802). In some examples, the generated example base query record 1012 includes the example base search term 1008 as well as identified textual information from the example identified text data structure 802 associated with (e.g., immediately following, on the same line as, and/or part of the same string as) the example base search term 1008. As described below in connection with the example object query record generator 222 of FIG. 12, the inclusion of such associated identified textual information in the generated base query record facilitates the identification of other search terms, such as, for example, the example object search term 1202 of FIG. 12. In instances where the example base query record generator 218 determines that one of the example identified text data structures 1002 does not include textual information matching the example base search term 1008, the example base query record generator 218 does not generate a base query record corresponding to that identified text data structure.

FIG. 11 is an illustration of an example base query record data structure 1100 containing the example base query records 1010 generated by the example base query record generator 218 of FIGS. 2 and/or 10 based on the example base search term 1008. In the illustrated example of FIG. 11, the example base query records 1010 are organized as separate lines within the example base query record data structure 1100. For example, the first line of the example base query record data structure 1100 corresponds to the example base query record 1012 described above, which in turn is associated with the example identified text data structure 802, the example screen shot 602, the example search results page 502, and the example image 306. In the illustrated example of FIG. 11, the second line of the example base query record data structure 1100 corresponds to the example base query record 1014 described above. In the illustrated example of FIG. 11, the example base query records 1010 can be segmented into two base query record groups. A first base query record group 1102 includes example base query records having associated identified textual information including the phrase "coke personalized bottle" following the base search term 1008 (e.g., "Best guess"). A second base query record group 1104 includes example base query records having associated identified textual information including the phrase "share a coke with names list" following the base search term 1008 (e.g., "Best guess").

While the example base query record data structure 1100 illustrated in FIG. 11 shows a specific number of example base query records 1010 and a specific number of example base query record groups 1102, 1104, the example base query record generator 218 may generate a base query record data structure 1100 having any number of example base query records and/or any number of example base query record groups. A base query record group may include example base query records having similar identified textual information regardless of whether the base query records in the group are organized in consecutive and/or sequential lines of the example base query record data structure 1100. Furthermore, a base query record group may include any number of base query records, including a single base query record.

Returning to the illustrated example of FIG. 2, the example base query record repository 220 stores base query records (e.g., the example base query records 1010 of FIG. 10 and/or the example base query record data structure 1100 of FIG. 11) generated by the example base query record generator 218. The example base query record repository 220 of FIG. 2 is implemented by one or more hard disk drives. However, the example base query record repository 220 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example base query records 1010 stored in the example base query record repository 220 may be stored in any file and/or data structure format, organization scheme, and/or arrangement. For example, the base query records 1010 may be stored as lines in the example base query record data structure 1100 as shown in FIG. 11, with the example base query record data structure 1100 being stored in the example base query record repository 220 as a text file (e.g., a .TXT file), a Microsoft® Word document (e.g., a .DOC file, a .DOCX file, etc.), etc. The example base query records 1010 and/or the example base query record data structure 1100 stored in the example base query record repository 220 are accessible to the example object query record generator 222 and/or the example object identifier 226 of FIG. 2, and/or, more generally, to the example video object identification system 100 of FIG. 1.

In the illustrated example of FIG. 2, the example object query record generator 222 generates object query records based on a query of the base query records (e.g., the example base query records 1010) generated by the example base query record generator 218 that satisfies one or more query criteria. In some examples, the object query record generator 222 receives and/or otherwise retrieves the base query records on which to perform a query from the example base query record repository 220 described above. For example, the example base query records 1010 described above in connection with FIGS. 10 and 11 and/or the example base query record data structure 1100 described above in connection with FIG. 11 may be accessed by the example object query record generator 222 from the example base query record repository 220.

Figure 12:
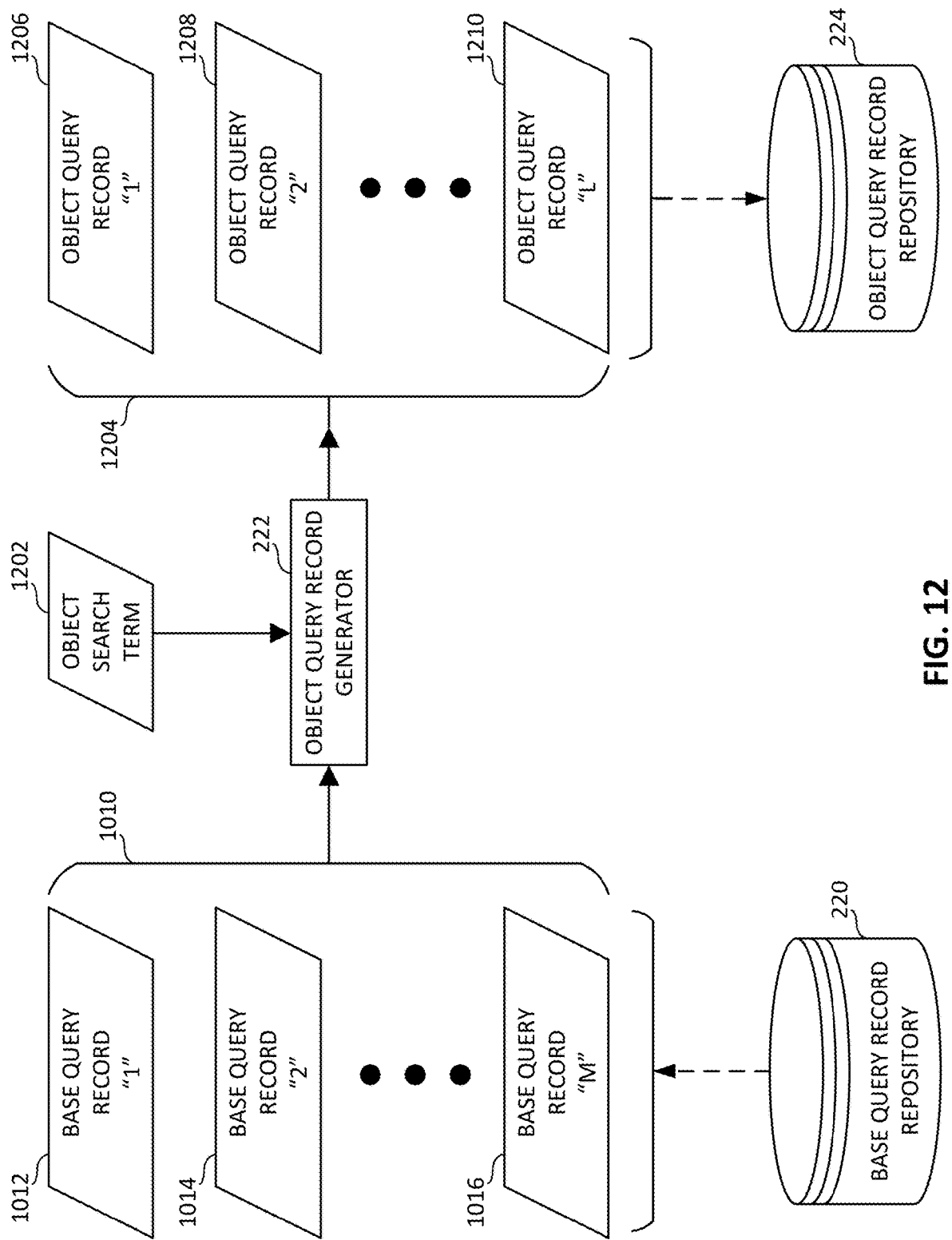
FIG. 12 further illustrates operation of the example object query record generator of FIG. 2.

The example object query record generator 222 of FIG. 2 is further illustrated in FIG. 12. In the illustrated example of FIG. 12, the object query record generator 222 receives and/or otherwise retrieves the example base query records 1010, which include the example base query record 1012, the example base query record 1014 and the example base query record 1016. In the illustrated example, the query is executed by the example object query record generator 222 to generate example object query records 1204 based on one or more query criteria including an example object search term 1202. In the illustrated example, the example object query records 1204 include an example object query record 1206, an example object query record 1208 and an example object query record 1210. In some examples, the object search term 1202 is associated with a word and/or phrase that appears in at least one of the example base query records 1010. For example, based on the example base query record data structure 1100 illustrated in FIG. 11 and described above, the example object search term 1202 applied by the example object identifier 226 may be the phrase "coke personalized bottle." Alternatively, the example search term applied by the example object identifier 226 may simply be the word "coke."

In some examples, the specific word(s) and/or phrase(s) to be included in the example object search term 1202 will be determined by the example object query record generator 222 based on the frequency with which such word(s) and/or phrase(s) appear among the textual information included in the example base query records 1010 and/or in the example base query record data structure 1100. For example, the object query record generator 222 may determine via a string comparison analysis, a phrase count analysis and/or a word count analysis that a particular word and/or phrase is included among the example base query records 1010 with a heightened frequency relative to other words and/or phrases included among the example base query records 1010. In the course of performing such an analysis, the example object query record generator 222 may ignore and/or filter out the example base search term 1008, as the example base search term 1008 appears in each of the example base query records 1010. For example, the example object query record generator 222 may determine that the phrase "coke personalized bottle" appears more frequently in the example base query record data structure 1100 of FIG. 11 relative to other phrases appearing in the example base query record data structure, such as the phrase "share a coke with names list." In making this determination, the example object record generator 222 ignores the phrase "Best guess," as such phrase constitutes the example base search term 1008 which appears in each of the example base query records 1010. In such an example, the object query record generator 222 determines that the phrase "coke personalized bottle" will be the example object search term 1202.

In the illustrated example of FIG. 12, the example object query record generator 222 queries the example base query records 1010 to determine if any of the base query records 1010 contain textual information matching the example object search term 1202. In instances where the example object query record generator 222 determines that one of the example base query records 1010 (e.g., the example base query record 1012) includes textual information matching the example object search term 1202, the example object query record generator 222 generates an object query record (e.g., the example object query record 1206) corresponding to the base query record (e.g., the example base query record 1012). In some examples, the generated example object query record 1206 includes the example object search term 1202 as well as the example base search term 1008 from which the corresponding example base query record 1012 was generated. In instances where the example object query record generator 222 determines that one of the example base query records 1010 does not include textual information matching the example object search term 1202, the example object query record generator 222 does not generate an object query record corresponding to that base query record.

FIG. 13 is an illustration of an example object query record data structure 1300 containing the example object query records 1204 generated by the example object query record generator 222 of FIGS. 2 and/or 12 based on the example object search term 1202. In the illustrated example of FIG. 13, the example object query records 1204 are organized as separate lines within the example object query record data structure 1300. For example, the first line of the example object query record data structure 1300 corresponds to the example object query record 1206 described above, which in turn is associated with the example base query record 1012, the example identified text data structure 802, the example screen shot 602, the example search results page 502, and the example image 306. In the illustrated example of FIG. 13, the second line of the example object query record data structure 1300 corresponds to the example object query record 1208 described above. In the illustrated example of FIG. 13, the example object query records 1204 include textual information corresponding to the example object search term 1202 (e.g., "coke personalized bottle") as well as textual information corresponding to the example base search term 1008 (e.g., "Best guess") from which the corresponding base query records were generated. While the example object query record data structure 1300 illustrated in FIG. 13 shows a specific number of example object query records 1204, the example object query record generator 222 may generate an object query record data structure 1300 having any number of example object base query records.

Returning to the illustrated example of FIG. 2, the example object query record repository 224 stores object query records (e.g., the example object query records 1204 of FIG. 12 and/or the example object query record data structure 1300 of FIG. 13) generated by the example object query record generator 222. The example object query record repository 224 of FIG. 2 is implemented by one or more hard disk drives. However, the example object query record repository 224 could additionally or alternatively be implemented by any type(s) and/or any number(s) of a storage drive, a storage disk, a flash memory, a ROM, a CD, a DVD, a Blu-ray disc, a cache, a RAM and/or any other storage medium in which information is stored for any duration (e.g., for extended time periods, permanently, brief instances, for temporarily buffering, and/or for caching of the information). The example object query records 1204 stored in the example object query record repository 224 may be stored in any file and/or data structure format, organization scheme, and/or arrangement. For example, the object query records 1204 may be stored as lines in the example object query record data structure 1300 as shown in FIG. 13, with the example object query record data structure 1300 being stored in the example object query record repository 224 as a text file (e.g., a .TXT file), a Microsoft® Word document (e.g., a .DOC file, a .DOCX file, etc.), etc. As described in detail herein, the example object query records 1204 and/or the example object query record data structure 1300 stored in the example object query record repository 224 are accessible to the example object identifier 226 of FIG. 2, and/or, more generally, to the example video object identification system 100 of FIG. 1.

In the illustrated example of FIG. 2, the example object identifier 226 identifies one or more objects (e.g., the example object 402 discussed above in connection with FIG. 4) depicted in a video based on a statistical criterion applied to the object query records generated by the example object query record generator 222 and/or the base query records generated by the example base query record generator 218 for the video. In some examples, the object identifier 226 receives and/or otherwise retrieves the object query records from the example object query record repository 224 described above. For example, the object query records 1204 and/or the object query record data structure 1300 described above in connection with FIGS. 12 and 13 may be accessed by the example object identifier 226 from the example object query record repository 224. In some examples, the object identifier 226 also receives and/or otherwise retrieves the base query records from the example base query record repository 220 described above. For example, the base query records 1010 and/or the base query record data structure 1100 described above in connection with FIGS. 10 and 11 may be accessed by the example object identifier 226 from the example base query record repository 220.

Figure 14:
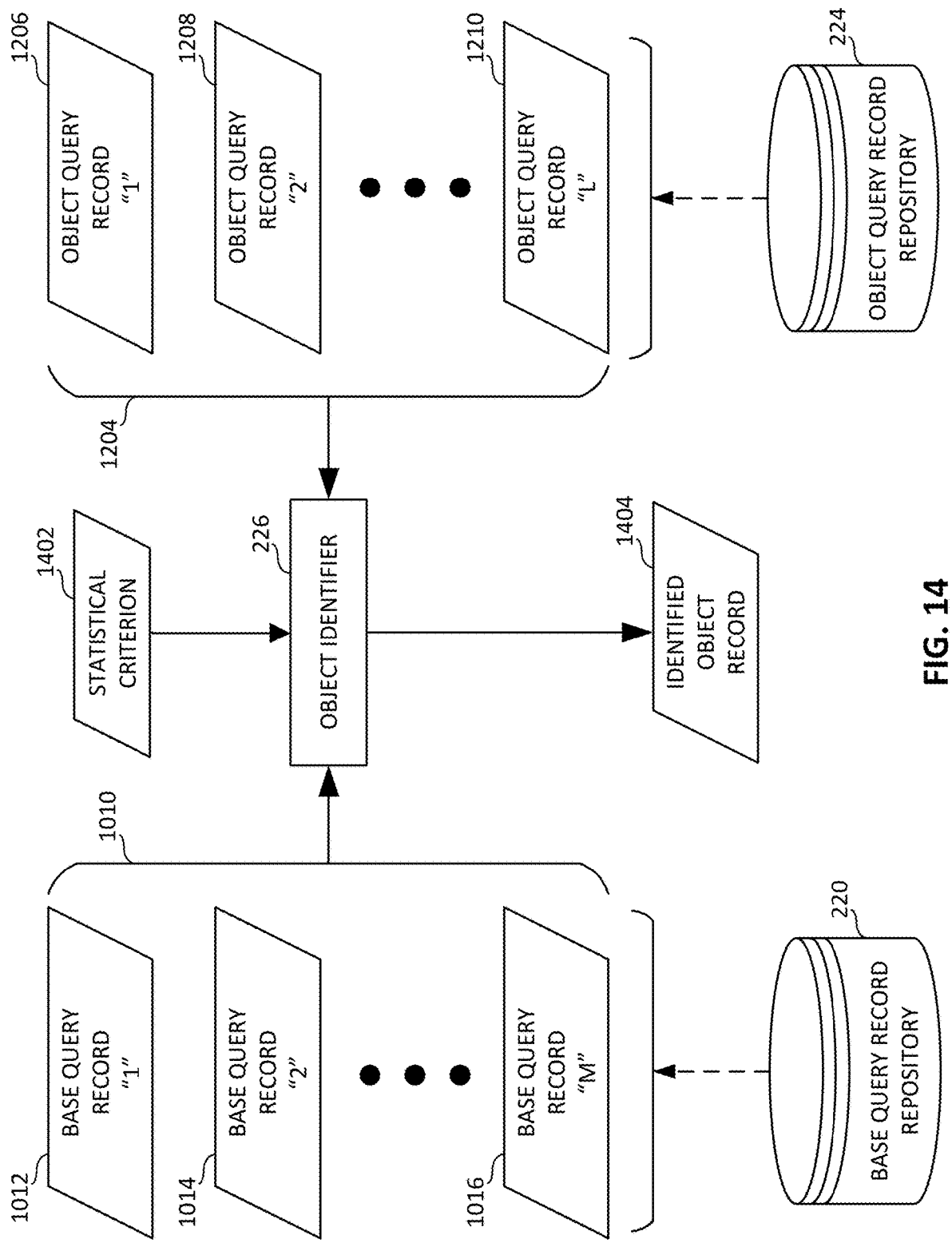
FIG. 14 further illustrates operation of the example object identifier of FIG. 2.

The example object identifier 226 of FIG. 2 is further illustrated in FIG. 14. In the illustrated example of FIG. 14, the object identifier 226 receives and/or otherwise retrieves the example object query records 1204 associated with a given video or a given portion of a video. In the illustrated example, the example object query records 1204 include the example object query record 1206, the example object query record 1208 and the example object query record 1210. The example object identifier 226 also receives and/or otherwise retrieves the example base query records 1010 associated with a given video or a given portion of a video. In the illustrated example, the example base query records 1010 include the example base query record 1012, the example base query record 1014 and the example base query record 1016.

In the illustrated example of FIG. 14, the example object identifier applies an example statistical criterion 1402 to the example object query records 1204 and/or the example base query records 1010. In some examples, the statistical criterion 1402 is a threshold specifying a total number of object query records to be generated by the example object query record generator 222 for the example object identifier 226 to identify an object. For example, the statistical criterion 1402 may specify that the example object identifier 226 identifies an object if a total of at least ten object query records (or some other number of object query records) have been generated by the example object query record generator 222 in relation to the example object search term 1202. The example object identifier 226 determines whether such an example statistical criterion 1402 is satisfied by determining (e.g., counting) the number of object query records (e.g., the number of lines in the example object query record data structure 1300 of FIG. 13) generated by the example object query record generator 222 in relation to the example object search term 1202. When applying the example statistical criterion 1402 described above to the example object query record data structure 1300 of FIG. 13, the example object identifier 226 determines that the statistical criterion 1402 is satisfied because the number of object query records 1204 (e.g., fifteen) satisfies the threshold number specified by the statistical criterion 1402 (e.g., ten).

In some examples, the statistical criterion 1402 is a threshold specifying a number of the object query records within a specified time period to be generated by the example object query record generator 222 for the example object identifier 226 to identify an object. In some such examples, the specified time period is based on the sampling rate at which the images corresponding to the object query records were extracted from the video. For example, the statistical criterion 1402 may specify that the example object identifier 226 identifies an object if at least ten object query records (or some other number of object query records) have been generated by the example object query record generator 222 in relation to the example object search term 1202, and may further specify that the qualifying object query records must span no more than ten consecutive seconds of time associated with the video from which the object query records have been derived. The example object identifier 226 determines whether the example statistical criterion 1402 is satisfied by determining (e.g., counting) the number of object query records (e.g., the number of lines in the example object query record data structure 1300 of FIG. 13) generated by the example object query record generator 222 in relation to the example object search term 1202, and then determining whether a sufficient number of those object query records fall within the specified time period. When applying the example statistical criterion 1402 described above to the example object query record data structure 1300 of FIG. 13, the example object identifier 226 determines that the statistical criterion 1402 is satisfied because, first, the number of object query records 1204 (e.g., fifteen) satisfies the threshold number specified by the statistical criterion 1402 (e.g., ten) and, second, the example object query records 1204 span a total of 0.5 seconds of time associated with the video from which those object query records have been derived, which falls within the specified time period (e.g., ten consecutive seconds). In the above example, the time associated with the video from which the object query records 1204 have been derived is computed by dividing the fifteen consecutively numbered object query records 1204 (corresponding to the first fifteen frames and/or example images 304 extracted from the example video 302) by the sampling rate (e.g., thirty frames per second) that was utilized when extracting the example images 304 from which the example object query records 1204 have been derived.

In some examples, the statistical criterion 1402 is a threshold specifying a consecutive number of object query records to be generated by the example object query record generator 222 for the example object identifier 226 to identify an object. For example, the statistical criterion 1402 may specify that the example object identifier 226 identifies an object if at least ten consecutively numbered object query records (or some other number of consecutive object query records) have been generated by the example object query record generator 222 in relation to the example object search term 1202. For example, the example object query record data structure 1300 of FIG. 13 includes fifteen consecutively numbered object query records 1204 identified as "result1.txt," "result2.txt," "result3.txt" and continuing consecutively through "result15.txt." The example object identifier 226 determines whether the example statistical criterion 1402 is satisfied by determining (e.g., counting) the consecutively numbered object query records (e.g., the consecutively numbered lines in the example object query record data structure 1300 of FIG. 13) generated by the example object query record generator 222 in relation to the example object search term 1202. When applying the example statistical criterion 1402 described above to the example object query record data structure 1300 of FIG. 13, the example object identifier 226 determines that the statistical criterion 1402 is satisfied because the number of consecutive object query records 1204 (e.g., fifteen) satisfies the threshold number specified by the statistical criterion 1402 (e.g., ten).

In some examples, the statistical criterion 1402 is a threshold specifying a percentage of the number of object query records generated by the example object query record generator 222 for a particular object search term 1202 in relation to the number of base query records generated by the example base query record generator 218 to be satisfied for the example object identifier 226 to identify an object in the input video as corresponding to the particular object search term 1202. For example, the statistical criterion 1402 may specify that the number of object query records generated by the example object query record generator 222 for a particular object search term 1202 constitute at least one percent (or some other percentage) of the number of base query records generated by the example base query record generator 218 in order for the object identifier 226 to determine that an object corresponding to the particular object search term 1202 is depicted in the input video being processed. The example object identifier 226 determines whether such an example statistical criterion 1402 is satisfied by determining (e.g., counting) the number of object query records generated by the example object query record generator 222 for a particular object search term 1202 (e.g., the number of lines in the example object query record data structure 1300 of FIG. 13), as well as the number of base query records for the input video (e.g., the number of lines in the example base query record data structure 1100 of FIG. 11) generated by the example base query record generator 218. The example object identifier 226 then calculates a percentage by dividing the determined number of object query records by the determined number of base query records, and multiplying the result by a factor of one hundred. When applying the example statistical criterion 1402 described above to the example base query record data structure 1100 of FIG. 11 and the example object query record data structure 1300 of FIG. 13, the example object identifier 226 may determine that a total of fifteen object query records exist for the object search term 1202 given by "coke personalized bottle," and a total of nine hundred base query records exist. Thus, the percentage calculated by the example object identifier 226 will be equal to 1.67 percent (e.g., fifteen object query records divided by nine hundred base query records, multiplied by a factor of one hundred). In such an example, the object identifier 226 determines that the example statistical criterion 1402 is satisfied because the percentage of object query records 1204 in relation to base query records 1010 (e.g., 1.67 percent) satisfies the threshold percentage specified by the statistical criterion (e.g., 1.00 percent).

In the illustrated examples of FIGS. 11-14 described above, when the statistical criterion is satisfied, the example object identifier 226 generates an example identified object record 1404 that identifies an object depicted in the example video 302. In the illustrated examples of FIGS. 11-14, the example identified object record 1404 may indicate that the example video 302 depicts an object constituting a "coke personalized bottle." As described above in connection with FIGS. 3 and 4, the example image 306 that was extracted from the example video 302 included an example object 402 appearing as a bottle of Coke® having a label associated with The Coca-Cola Company, the label including the word "Alisha" among other textual information. Thus, in the illustrated example, the example object identifier 226, and/or, more generally, the example video object identification system 100, has properly identified the example object 402 (e.g., a bottle of Coke® labelled with the name "Alisha") depicted in the example video 302 as a "coke personalized bottle."

While the examples described above result in the example video object identification system 100 identifying an object including a brand (e.g., Coke®), the object identified by the example video object identification system 100 may additionally and/or alternatively include other types of information such as, for example, a logo (e.g., the "wave logo" of The Coca-Cola Company) and/or a commercial or advertising campaign (e.g., The Coca-Cola Company's "Share A Coke" campaign, or a commercial associated therewith), etc.

FIG. 15 is an example script 1500 including example machine-readable instructions that may be executed to implement the example video object identification system 100 of FIGS. 1 and/or 2. In the illustrated example, the script 1500 includes an example first portion of code 1502. The first portion of code 1502 instructs the example video frame sampler 204 of the example video object identification system 100 to extract and/or sample images (e.g., the example images 304) from a video (e.g., the example video 302). In the illustrated example, the script 1500 includes an example second portion of code 1504. The second portion of code 1504 instructs the example video object identification system 100 to upload the extracted images (e.g., the example images 304) to a webserver.

In the illustrated example of FIG. 15, the script 1500 includes an example third portion of code 1506. The third portion of code 1506 instructs the example video object identification system 100 to begin an image processing cycle to be applied to each of the extracted and uploaded images (e.g., the example images 304). In the illustrated example, the script 1500 includes an example fourth portion of code 1508. The fourth portion of code 1508 instructs the example video object identification system 100, for each extracted image, to provide a reverse image search engine (e.g., the example reverse image search engine 130) with a URL corresponding to the webserver to which the extracted image (e.g., the example image 306) was uploaded. The fourth portion of code further instructs the example screen capturer 210 of the example video object identification system 100, for each extracted image, to capture a screen shot (e.g., the example screen shot 602) corresponding to a search results page (e.g., the example search results page 502) returned by the reverse image search engine. In the illustrated example, the script 1500 includes an example fifth portion of code 1510. The fifth portion of code 1510 instructs the example text identifier 214 of the example video object identification system 100, for each extracted image, to identify textual information (e.g., the example identified text data structure 802) from the screen shot (e.g., the example screen shot 602) generated by the example screen capturer 210. In the illustrated example, the script 1500 includes an example sixth portion of code 1512. The sixth portion of code 1512 instructs the example video object identification system 100 to complete the image processing cycle once all of the images (e.g., the example images 304) have been processed.

In the illustrated example of FIG. 15, the script 1500 includes an example seventh portion of code 1514. The seventh portion of code 1514 instructs the example base query record generator 218 of the example video object identification system 100 to execute a query of the identified text data structures (e.g., the example identified text data structures 1002) based on a base search term (e.g., the example base search term 1008) to determine base query records (e.g., the example base query records 1010) containing identified text data matching the base search term. In the illustrated example of FIG. 15, the script 1500 includes an example eighth portion of code 1516. The eighth portion of code 1516 instructs the example object query record generator 222 of the example video object identification system 100 to execute a query of the base query records (e.g., the example base query records 1010) based on an object search term (e.g., the example object search term 1202) to determine object query records (e.g., the example object query records 1204) containing identified text data matching the object search term.

In the illustrated example, the script 1500 includes an example ninth portion of code 1518. The ninth portion of code 1518 instructs the example object identifier 226 of the example video object identification system 100 to determine the number of base query records (e.g., the example base query records 1010) generated by the example base query record generator 218 for the base search term (e.g., the example base search term 1008) and the number of object query records (e.g., the example object query records 1204) generated by the example object query record generator 222 for the object search term (e.g., the example object search term 1202) for the input video.

In the illustrated example of FIG. 15, the example script 1500, based on the sequence of processes described above, provides the example video object identification system 100 with sufficient information to enable the example object identifier 226 to determine whether a statistical criterion (e.g., the example statistical criterion 1402) is satisfied. In instances where the example object identifier 226 determines that the statistical criterion is satisfied, the example object identifier 226 generates an identified object record (e.g., the example identified object record 1404) identifying an object (e.g., the example object 402) depicted in a video (e.g., the example video 302).

While an example manner of implementing the example video object identification system 100 is illustrated in FIGS. 1-3, 6, 8, 10, 12 and 14, one or more of the elements, processes and/or devices illustrated in FIGS. 1-3, 6, 8, 10, 12 and 14 may be combined, divided, re-arranged, omitted, eliminated and/or implemented in any other way. For example, the example video repository 202, the example image repository 206, the example search results page repository 208, the example screen shot repository 212, the example identified text repository 216, the example base query record repository 220 and the example object query record repository 224 may be combined into a single repository that stores the example videos, images, search results pages, screen shots, identified text data structures, base query records and object query records described above. Further, the example video repository 202, the example video frame sampler 204, the example image repository 206, the example search results page repository 208, the example screen capturer 210, the example screen shot repository 212, the example text identifier 214, the example identified text repository 216, the example base query record generator 218, the example base query record repository 220, the example object query record generator 222, the example object query record repository 224, the example object identifier 226, and/or, more generally, the example video object identification system 100 of FIGS. 1-3, 6, 8, 10, 12 and/or 14 may be implemented by hardware, software, firmware and/or any combination of hardware, software and/or firmware. Thus, for example, any of the example video repository 202, the example video frame sampler 204, the example image repository 206, the example search results page repository 208, the example screen capturer 210, the example screen shot repository 212, the example text identifier 214, the example identified text repository 216, the example base query record generator 218, the example base query record repository 220, the example object query record generator 222, the example object query record repository 224, the example object identifier 226, and/or, more generally, the example video object identification system 100 of FIGS. 1-3, 6, 8, 10, 12 and/or 14 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video repository 202, the example video frame sampler 204, the example image repository 206, the example search results page repository 208, the example screen capturer 210, the example screen shot repository 212, the example text identifier 214, the example identified text repository 216, the example base query record generator 218, the example base query record repository 220, the example object query record generator 222, the example object query record repository 224, and/or the example object identifier 226 of FIGS. 2-3, 6, 8, 10, 12 and/or 14 is/are hereby expressly defined to include a tangible computer readable storage device or storage disk such as a memory, a digital versatile disk (DVD), a compact disk (CD), a Blu-ray disk, etc. storing the software and/or firmware. Further still, the example video object identification system 100 of FIGS. 1-3, 6, 8, 10, 12 and 14 may include one or more elements, processes and/or devices in addition to, or instead of, those illustrated in FIGS. 1-3, 6, 8, 10, 12 and 14, and/or may include more than one of any or all of the illustrated elements, processes and devices.

Figure 16:
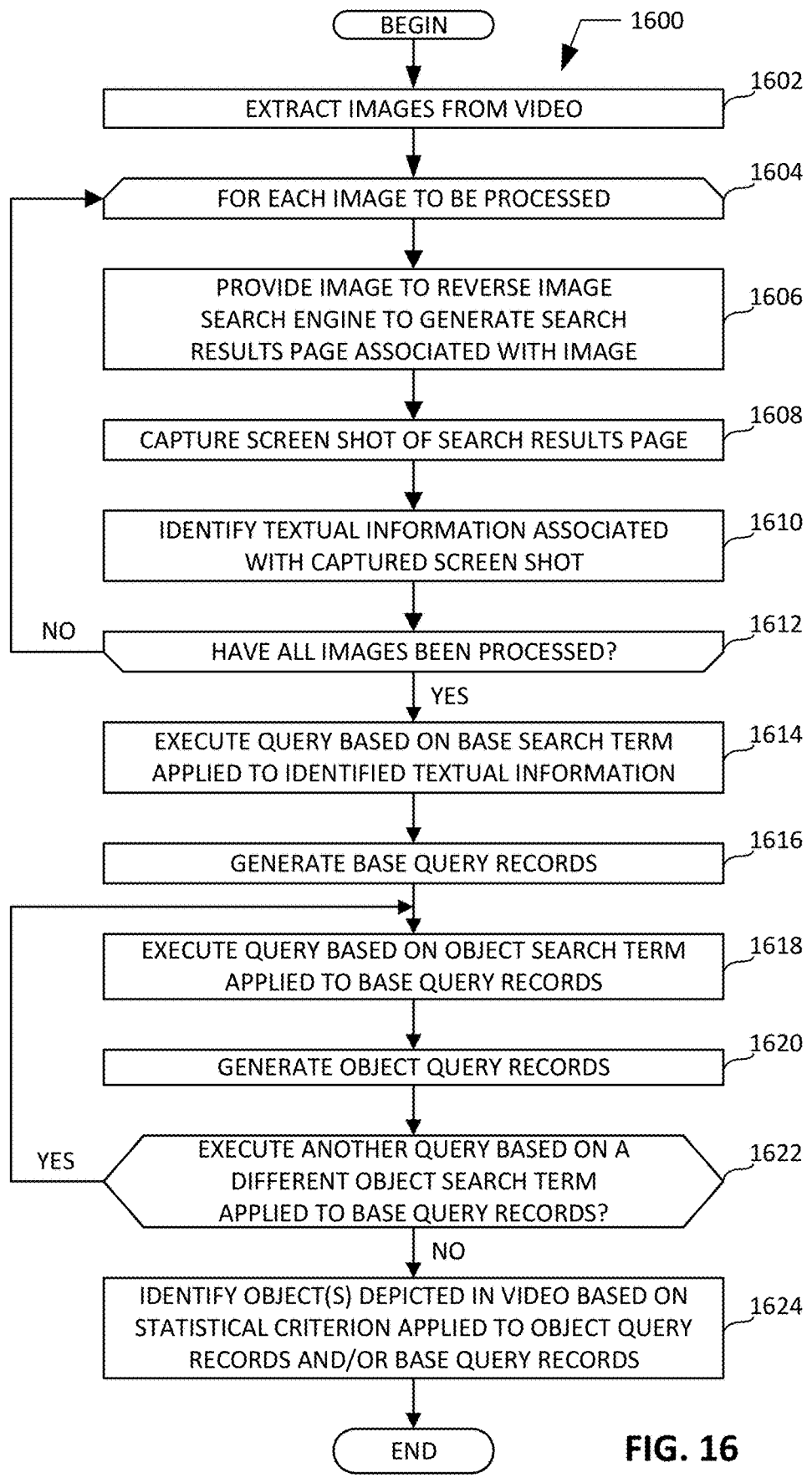
FIG. 16 is a flowchart representative of example machine-readable instructions that may be executed to implement the example video object identification system of FIGS. 1 and/or 2.

A flowchart representative of example machine readable instructions for implementing the example video object identification system 100 of FIGS. 1-3, 6, 8, 10, 12 and 14 is shown in FIG. 16. In this example, the machine readable instructions comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIG. 16, many other methods of implementing the example video object identification system 100 may alternatively be used. For example, the order of execution of the blocks may be changed, and/or some of the blocks described may be changed, eliminated, or combined.

As mentioned above, the example processes of FIG. 16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 16 is a flowchart representative of example machine-readable instructions 1600 that may be executed to implement the example video object identification system 100 of FIGS. 1 and/or 2. The program 1600 of FIG. 16 begins when the example video frame sampler 204 of FIGS. 2 and 3 extracts and/or samples images (e.g., the example images 304) from a video (e.g., the example video 302) (block 1602).

Once the example video frame sampler 204 has extracted one or more images from the input video, the example program 1600 of FIG. 16 begins an image processing cycle to be executed for each extracted image on which object identification is to be performed (block 1604). In the image processing cycle, the example video object identification system 100 of FIGS. 1 and/or 2 provides an image (e.g., the example image 306) to the example reverse image search engine 130 of FIGS. 1, 2 and/or 5 which generates a search results page (e.g., the example search results page 502) associated with the image (e.g., the example image 306) (block 1606). In the image processing cycle, the example screen capturer 210 of FIGS. 2 and/or 6 also captures a screen shot (e.g., the example screen shot 602) of the search results page (e.g., the example search results page 502) (block 1608). In the image processing cycle, the example text identifier 214 of FIGS. 2 and/or 8 further identifies textual information (e.g., the example identified text data structure 802) from the screen shot (e.g., the example screen shot 602) generated by the example screen capturer 210 (block 1610).

The example program 1600 of FIG. 16 repeats the image processing cycle described above until the program 1600 and/or the example video object identification system 100 determines that processing of the extracted images (e.g., the example images 304) is complete (block 1612). Once such a determination has been made, the example base query record generator 218 of FIGS. 2 and 10 executes a query of the identified text data structures (e.g., the example identified text data structures 1002) based on a base search term (e.g., the example base search term 1008) (block 1614), and generates base query records (e.g., the example base query records 1010) corresponding to the base query results (block 1616).

Next, the example object query record generator 222 of FIGS. 2 and 12 executes a query of the base query records (e.g., the example base query records 1010) based on an object search term (e.g., the example object search term 1202) (block 1618), and generates object query records (e.g., the example object query records 1204) corresponding to the object query results (block 1620). The example object query record generator 222 determines whether to execute another query of the base query records (e.g., the example base query records 1010) based on a different object search term (block 1622). If the object query record generator 222 determines to execute another query, control of the program 1600 returns to block 1618. If the object query record generator 222 determines not to execute another query, the program 1600 proceeds to block 1624.

Next, the example object identifier 226 of FIGS. 2 and/or 14 identifies one or more objects (e.g., the example object 402) depicted in the video (e.g., the example video 302) based on whether one or more statistical criteria (e.g., the example statistical criterion 1402) applied to the object query records (e.g., the example object query records 1204) and/or the base query records (e.g., the example base query records 1010) is/are satisfied (block 1624). The statistical criterion 1402 may include, for example, a specified total number of object query records associated with a particular object search term, a specified number of object query records associated with a particular object search term within a specified time period, a specified consecutive number of object query records associated with a particular object search term, and/or a specified percentage of the number of object query records associated with a particular object search term relative to the number of base query records from which the object query records were derived. In connection with identifying an object depicted in the video at block 1624, the example object identifier 226 may generate an identified object record (e.g., the example identified object record 1404) that describes the identified object.

Figure 17:
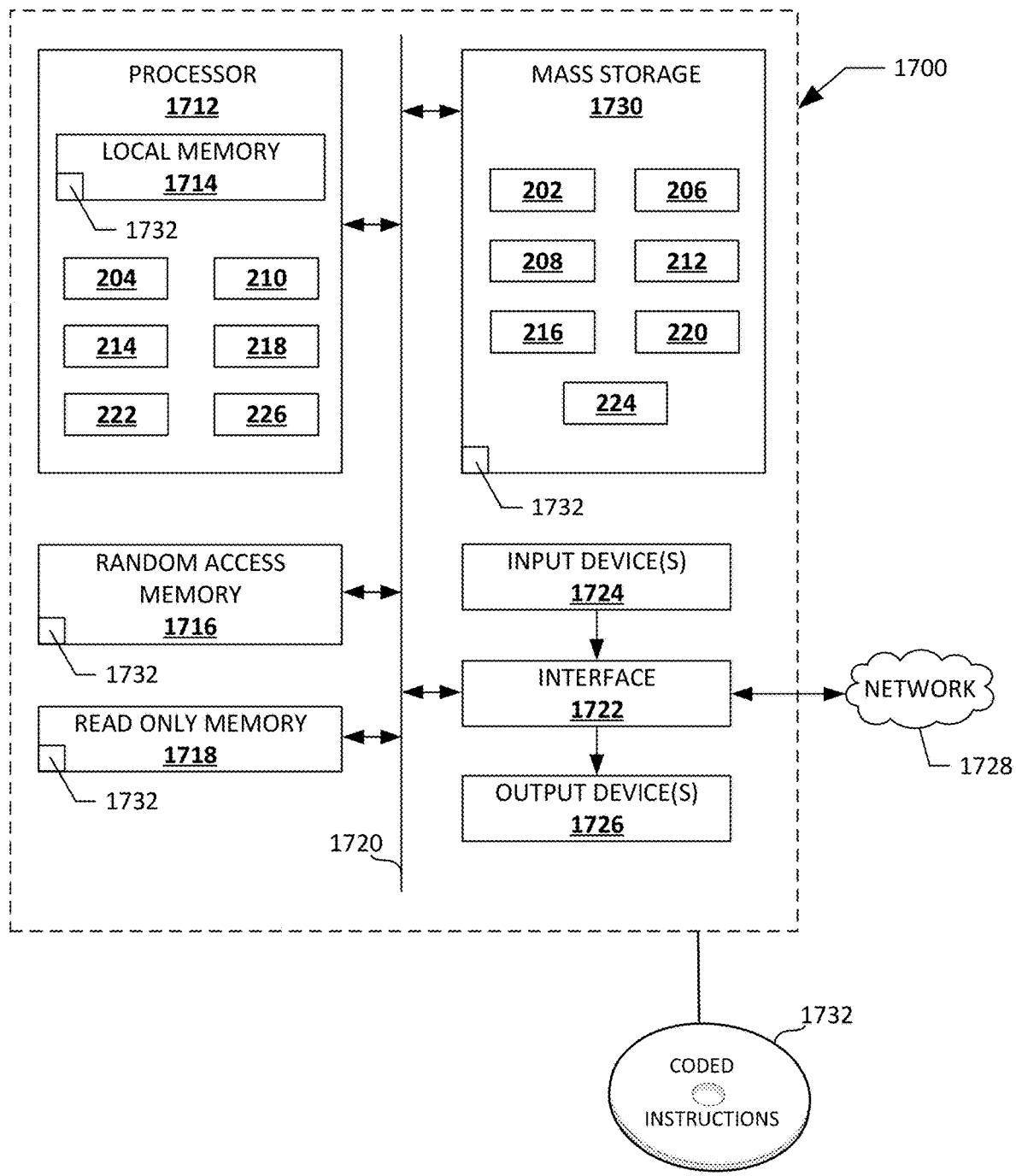
FIG. 17 is a block diagram of an example processing platform structured to execute the example script of FIG. 15 and/or the example instructions of FIG. 16 to implement the example video object identification system of FIGS. 1 and/or 2.

FIG. 17 is a block diagram of an example processor platform 1700 structured to execute the example script of FIG. 15 and/or the example instructions of FIG. 16 to implement the example video object identification system 100 of FIGS. 1-3, 6, 8, 10, 12 and 14. The processor platform 1700 can be, for example, a server, a personal computer, a mobile device (e.g., a cell phone, a smart phone, a tablet such as an iPad™), a personal digital assistant (PDA), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example executes example instructions 1500, 1600 to implement the example video frame sampler 204, the example screen capturer 210, the example text identifier 214, the example base query record generator 218, the example object query record generator 222 and the example object identifier 226 described above in connection with FIGS. 2-3, 6, 8, 10, 12 and 14. The example processor 1712 also includes a local memory 1714 (e.g., a cache). The processor 1712 of the illustrated example is in communication with a main memory including a volatile memory 1716 and a non-volatile memory 1718 via a bus 1720. The volatile memory 1716 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1718 may be implemented by flash memory and/or any other desired type of memory device. Access to the main memory 1716, 1718 is controlled by a memory controller.

The processor platform 1700 of the illustrated example also includes an interface circuit 1722. The interface circuit 1722 may be implemented by any type of interface standard, such as an Ethernet interface, a universal serial bus (USB), and/or a PCI express interface.

In the illustrated example, one or more input devices 1724 are connected to the interface circuit 1722. The input device(s) 1724 permit(s) a user to enter data and commands into the processor 1712. The input device(s) can be implemented by, for example, a keyboard, a mouse, a touchscreen, a track-pad, a trackball, isopoint and/or a voice recognition system.

One or more output devices 1726 are also connected to the interface circuit 1722 of the illustrated example. The output devices 1726 can be implemented, for example, by display devices (e.g., a liquid crystal display, a cathode ray tube display (CRT), a touchscreen, a printer and/or speakers). The interface circuit 1722 of the illustrated example, thus, typically includes a graphics driver card, a graphics driver chip or a graphics driver processor.

The interface circuit 1722 of the illustrated example also includes a communication device such as a transmitter, a receiver, a transceiver, a modem and/or network interface card to facilitate exchange of data with external machines (e.g., computing devices of any kind) via a network 1728 (e.g., an Ethernet connection, a digital subscriber line (DSL), a telephone line, coaxial cable, a cellular telephone system, etc.).

The processor platform 1700 of the illustrated example also includes one or more mass storage devices 1730 for storing software and/or data. Examples of such mass storage devices 1730 include floppy disk drives, hard drive disks, compact disk drives, Blu-ray disk drives, RAID systems, and digital versatile disk (DVD) drives. In the illustrated example, the mass storage device 1730 includes the example video repository 202, the example image repository 206, the example search results page repository 208, the example screen shot repository 212, the example identified text repository 216, the example base query record repository 220 and the example object query record repository 224.

The coded instructions 1732 of FIG. 17, which includes the example instructions described above in connection with FIGS. 15 and/or 16, may be stored in the mass storage device 1730, in the local memory 1714, in the volatile memory 1716, in the non-volatile memory 1718, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to identify objects depicted in videos, the system comprising:
   memory; and
   processor circuitry to execute computer readable instructions to:
   process a plurality of image frames of a first video with a reverse image search engine to generate a corresponding plurality of search results pages;
   capture a plurality of screenshots corresponding respectively to the plurality of the search results pages;
   generate a plurality of base query records corresponding respectively to ones of the screenshots that have respective textual information that matches a base search term, the respective ones of the base query records including the base search term and at least portions of the respective textual information from the corresponding screenshots;
   determine an object search term based on a frequency analysis of the textual information included in the base query records, the frequency analysis to exclude the base search term from the base query records;
   generate a plurality of object query records corresponding respectively to ones of the base query records that have respective textual information that match the object search term; and
   identify a first object depicted in the first video based on at least one criteria applied to the object query records.

2. The system as defined in claim 1, wherein the respective ones of the image frames are accessible from an image repository by the reverse image search engine based on resource locators associated with the image frames.

3. The system as defined in claim 1, wherein the frequency analysis includes at least one of a word count analysis, a phrase count analysis, or a string comparison analysis.

4. The system as defined in claim 1, wherein the base search term is associated with at least one of a word or a phrase included in at least some of the plurality of the search results pages returned by the reverse image search engine.

5. The system as defined in claim 1, wherein the base search term is associated with at least one of a position or a threshold relative to a configuration of a layout associated with the plurality of the search results pages returned by the reverse image search engine.

6. The system as defined in claim 1, wherein the respective portions of the respective textual information from the corresponding screenshots at least one of follow the base search term in the corresponding screenshots, are on a same line as the base search term in the corresponding screenshots, or are part of a same string as the base search term in the corresponding screenshots.

7. The system as defined in claim 1, wherein the at least one criteria includes a threshold based on a first number of the object query records including the object search term.

8. The system as defined in claim 1, wherein the at least one criteria includes a threshold based on a first number of the object query records including the object search term within a first time period, the first time period based on a sampling rate at which the image frames were obtained from the first video.

9. The system as defined in claim 1, wherein the at least one criteria includes a threshold based on a first consecutive number of the object query records including the object search term.

10. The system as defined in claim 1, wherein the criteria includes a threshold based on a first percentage of a number of object query records including the object search term relative to a number of base query records including the base search term.

11. At least one non-transitory computer readable medium comprising computer readable instructions that, when executed, cause one or more processors to at least:
process a plurality of image frames of a first video with a reverse image search engine to generate a corresponding plurality of search results pages;
capture a plurality of screenshots corresponding respectively to the plurality of the search results pages;
generate a plurality of base query records corresponding respectively to ones of the screenshots that have respective textual information that matches a base search term, the respective ones of the base query records including the base search term and at least portions of the respective textual information from the corresponding screenshots;
determine an object search term based on a frequency analysis of the textual information included in the base query records, the frequency analysis to exclude the base search term from the base query records;
generate a plurality of object query records corresponding respectively to ones of the base query records that have respective textual information that matches the object search term; and
identify a first object depicted in the first video based on at least one criteria applied to the object query records.

12. The at least one non-transitory computer readable medium as defined in claim 11, wherein the frequency analysis includes at least one of a word count analysis, a phrase count analysis, or a string comparison analysis.

13. The at least one non-transitory computer readable medium as defined in claim 11, wherein the base search term is associated with at least one of a word or a phrase included in at least some of the plurality of the search results pages returned by the reverse image search engine.

14. The at least one non-transitory computer readable medium as defined in claim 11, wherein the base search term is associated with at least one of a position or a threshold relative to a configuration of a layout included in the respective ones of the search results pages returned by the reverse image search engine.

15. The at least one non-transitory computer readable medium as defined in claim 11, wherein the respective portions of the respective textual information from the corresponding screenshots at least one of follow the base search term in the corresponding screenshots, are on a same line as the base search term in the corresponding screenshots, or are part of a same string as the base search term in the corresponding screenshots.

16. An apparatus to identify objects depicted in videos, the apparatus comprising:
means for capturing a plurality of screenshots corresponding respectively to a plurality of search results pages returned from a reverse image search engine, the plurality of search results pages corresponding respectively to a plurality of image frames of a first video processed by the reverse image search engine;
means for generating a plurality of base query records corresponding respectively to ones of the screenshots that have respective textual information that matches a base search term, the respective ones of the base query records including the base search term and at least portions of the respective textual information from the corresponding screenshots;
means for determining an object search term based on a frequency analysis of the textual information included in the base query records, the frequency analysis to exclude the base search term from the base query records;
means for generating a plurality of object query records corresponding respectively to ones of the base query records that have respective textual information that matches the object search term; and
means for identifying a first object depicted in the first video based on at least one criteria applied to the object query records.

17. The apparatus as defined in claim 16, wherein the frequency analysis includes at least one of a word count analysis, a phrase count analysis, or a string comparison analysis.

18. The apparatus as defined in claim 16, wherein the base search term is associated with at least one of a word or a phrase included in at least some of the plurality of the search results pages returned by the reverse image search engine.

19. The apparatus as defined in claim 16, wherein the base search term is associated with at least one of a position or a threshold relative to a configuration of a layout associated with the plurality of the search results pages returned by the reverse image search engine.

20. The apparatus as defined in claim 16, wherein the respective portions of the respective textual information from the corresponding screenshots at least one of follow the base search term in the corresponding screenshots, are on a same line as the base search term in the corresponding screenshots, or are part of a same string as the base search term in the corresponding screenshots.

* * * * *